US012777543B2

(12) United States Patent
Wu et al.

(10) Patent No.: US 12,777,543 B2
(45) Date of Patent: Oct. 27, 2026

(54) METHOD AND USER EQUIPMENT FOR BEAM FAILURE RECOVERY REQUEST INDICATION IN A MULTI-SERVING-CELL GROUP

(71) Applicant: Apogee 5G Global, LLC, Plano, TX (US)

(72) Inventors: Lu Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 41 days.

(21) Appl. No.: 17/512,680

(22) Filed: Oct. 28, 2021

(65) Prior Publication Data

US 2022/0141909 A1 May 5, 2022

(30) Foreign Application Priority Data

Oct. 29, 2020 (CN) ......................... 202011179423.6

(51) Int. Cl.
*H04W 76/18* (2018.01)
*H04L 1/00* (2006.01)
(Continued)

(52) U.S. Cl.
CPC ........... *H04W 76/18* (2018.02); *H04L 5/0073* (2013.01); *H04W 72/541* (2023.01)

(58) Field of Classification Search
CPC ......... H04W 74/0833; H04W 36/0079; H04W 88/085; H04W 88/08; H04W 88/02;
(Continued)

(56) References Cited

U.S. PATENT DOCUMENTS

2014/0334395 A1* 11/2014 Lee ....................... H04L 5/0053 370/329
2015/0029964 A1* 1/2015 Seo ......................... H04L 5/001 370/329
(Continued)

FOREIGN PATENT DOCUMENTS

CN 110769470 A 2/2020
CN 110945898 A 3/2020
(Continued)

OTHER PUBLICATIONS

First Office Action of Chinese patent application No. CN202011179423.6 dated Jan. 10, 2024.
(Continued)

*Primary Examiner* — Marcus Smith
*Assistant Examiner* — Jason A Harley
(74) *Attorney, Agent, or Firm* — Volpe Koenig

(57) ABSTRACT

The present disclosure provides a method and device in communication nodes for wireless communications. A first node receives a reference signal group respectively on each serving cell in a first cell group; and transmits a target signal in a target radio resource group. The first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the former of the target radio resource group and the target signal is used to indicate that the target cell is one of three possibilities of the first serving cell.

20 Claims, 5 Drawing Sheets

(51) Int. Cl.

| | |
|---|---|
| ***H04L 5/00*** | (2006.01) |
| ***H04W 24/10*** | (2009.01) |
| ***H04W 36/24*** | (2009.01) |
| ***H04W 48/18*** | (2009.01) |
| ***H04W 72/02*** | (2009.01) |
| ***H04W 72/12*** | (2023.01) |
| ***H04W 72/541*** | (2023.01) |

(58) Field of Classification Search

CPC ............. H04W 28/06; H04W 36/0085; H04W 72/0446; H04W 76/18; H04B 7/06964; H04B 7/0626; H04L 27/261

USPC .......................................................... 370/254

See application file for complete search history.

(56) References Cited

U.S. PATENT DOCUMENTS

| | | | | |
|---|---|---|---|---|
| 2019/0335496 | A1* | 10/2019 | Li | H04L 1/1887 |
| 2020/0100154 | A1* | 3/2020 | Cirik | H04W 72/20 |
| 2020/0344621 | A1* | 10/2020 | Xu | H04B 7/088 |
| 2021/0051651 | A1* | 2/2021 | He | H04B 7/088 |
| 2021/0307102 | A1* | 9/2021 | Babaei | H04W 80/02 |
| 2022/0053522 | A1* | 2/2022 | MolavianJazi | H04L 1/1819 |
| 2022/0131591 | A1* | 4/2022 | Huang | H04W 16/28 |
| 2022/0159767 | A1* | 5/2022 | Zhang | H04W 76/18 |
| 2023/0092905 | A1* | 3/2023 | Zhang | H04L 5/001 370/331 |
| 2023/0216563 | A1* | 7/2023 | Jiang | H04L 5/0048 |
| 2023/0254811 | A1* | 8/2023 | Wang | H04W 64/00 370/330 |

FOREIGN PATENT DOCUMENTS

| | | | |
|---|---|---|---|
| CN | 111818591 | A | 10/2020 |
| WO | 2020168907 | A1 | 8/2020 |

OTHER PUBLICATIONS

First Search Report of Chinese patent application No. CN202011179423.6 dated Jan. 8, 2024.

Third Generation Partnership Project, "Technical Specification Group Radio Access Network; NR; Requirements for support of radio resource management (Release 16)," 3GPP TS 38.133 V16.5.0 (Sep. 2020).

Third Generation Partnership Project, "Technical Specification Group Radio Access Network; NR; Physical channels and modulation (Release 16)," 3GPP TS 38.211 V16.3.0 (Sep. 2020).

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, "Technical Specification Group Radio Access Network; NR; Radio Resource Control (RRC) protocol specification (Release 16)," 3GPP TS 38.331 V16.2.0 (Sep. 2020).

* cited by examiner

METHOD AND USER EQUIPMENT FOR BEAM FAILURE RECOVERY REQUEST INDICATION IN A MULTI-SERVING-CELL GROUP

CROSS REFERENCE TO RELATED APPLICATIONS

This application claims the priority benefit of Chinese Patent Application No. 202011179423.6, filed on Oct. 29, 2020, the full disclosure of which is incorporated herein by reference.

BACKGROUND

Technical Field

The present disclosure relates to transmission methods and devices in wireless communication systems, and in particular to a method and device of radio signal transmission in wireless communications supporting cellular networks.

Related Art

In New Radio (NR), Massive Multi-Input Multi-Output (MIMO) is a key technology. In the massive MIMO, multiple antennas based on beamforming to form a relatively narrow beam which points to a particular direction to improve the quality of communication. Since the beam formed through multi-antenna beamforming is usually narrow, beams from both sides of communication shall be aligned to enable effective communication. A beam failure recovery mechanism is developed in 3rd Generation Partner Project (3GPP) Release 15 (R15), that is, when a beam failure occurs, the rapid recovery of beam failure is implemented. In the case of multiple serving cells, the beam recovery mechanism of different serving cells in case of beam failure is a research focus.

SUMMARY

Inventors find through researches that a negative impact of beam based communication is the decline or interruption of communication quality caused by beam failure. In the case of multiple serving cells, the beam recovery mechanism for different serving cells in case of beam failure is a research focus.

To address the above problem, the present disclosure provides a solution. It should be noted that although the above description uses large-scale MIMO and beam-based communication scenarios as examples, the application is also applicable to other scenarios, such as LTE multi-antenna systems, where similar technical effects can be achieved. Additionally, the adoption of a unified solution for various scenarios (including but not limited to large-scale MIMO, beam-based communications and LTE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

- receiving a reference signal group respectively on each serving cell in a first cell group; and
- transmitting a target signal in a target radio resource group;
- herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, a problem to be solved in the present disclosure is in the case of a plurality of serving cells, the beam recovery mechanism of different serving cells.

In one embodiment, a problem to be solved in the present disclosure is in the case of a plurality of serving cells, how to determine that a link failure occurs on which serving cell.

In one embodiment, a problem to be solved in the present disclosure is: in the case where a Secondary Cell (SCell) is allowed to cross-schedule a Primary Cell (PCell) or a Primary Secondary Cell Group Cell (PSCell), beam recovery mechanisms of the PCell or the PSCell, the SCell allowed to cross-schedule the PCell or the PSCell, and other SCells (that is, SCells not allowed to cross-schedule the PCell or the PSCell).

In one embodiment, a problem to be solved in the present disclosure is: in the case where an SCell is allowed to cross-schedule a PCell or a PSCell, how to determine that a beam failure occurs on which serving cell of the PCell or the PSCell, the SCell allowed to cross-schedule the PCell or the PSCell, and other SCells (that is, SCells not allowed to cross-schedule the PCell or the PSCell).

In one embodiment, the above method is essential in that the reference signal group on the given cell is used for a beam failure detection of the given cell, a target signal is used for a beam failure recovery request, and a target radio resource group is radio resources occupied by the beam failure recovery request; according to at least the former of the radio resources occupied by the beam failure recovery request and the beam failure recovery request, it is determined that in which of a first serving cell, a second serving cell, or other cells a beam failure occurs. The advantage of adopting the above method is to quickly identify a serving cell where a beam failure occurs and quickly recover beam communications on it.

In one embodiment, the above method is essential in that the reference signal group on the given cell is used for a beam failure detection of the given cell, a target signal is used for a beam failure recovery request, and a target radio resource group is radio resources occupied by a beam failure recovery request; a first serving cell is a PCell or a PSCell, a second serving cell is an SCell allowed to cross-schedule the PCell or the PSCell, and other serving cells are SCells not allowed to cross schedule the PCell or the PSCell; according to at least the former of radio resources occupied by the beam failure recovery request and the beam failure recovery request, it is determined that in which serving cell of the PCell or the PSCell, the SCell allowed to cross-schedule the PCell or the PSCell, and other SCells (that is, SCells not allowed to cross-schedule the PCell or PSCell) a beam failure occurs. The advantage of adopting the above method is to quickly identify the PCell or the PSCell, the SCell allowed to cross-schedule the PCell or the PSCell, so as to quickly recover beam communications on it.

According to one aspect of the present disclosure, comprising:

- monitoring a response to the target signal in a reference radio resource group;
- herein, the reference radio resource group belongs to a first time window in time domain, and the target radio resource group is used to determine the first time window.

According to one aspect of the present disclosure, wherein when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

According to one aspect of the present disclosure, wherein when the target cell is the first serving cell and the link failure does not occur in the second serving cell, the reference radio resource group comprises radio resources on the second serving cell; when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

According to one aspect of the present disclosure, wherein a measurement performed on at least one reference signal resource in the reference signal group on the second serving cell is used to determine whether a link failure occurs on the first serving cell.

According to one aspect of the present disclosure, wherein the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell.

According to one aspect of the present disclosure, wherein when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; a failure in a link corresponding to which subgroup of the first reference signal subgroup and the second reference signal subgroup is used to determine whether the target radio resource group belongs to the first resource subset or the second resource subset.

According to one aspect of the present disclosure, wherein when the target cell is the first serving cell, the reference radio resource group is a first resource subgroup or a second resource subgroup, the first reference signal subgroup corresponds to the first resource subgroup, and the second reference signal subgroup corresponds to the second resource subgroup; whether a link failure is corresponding to the first reference signal subgroup or the second reference signal subgroup is used to determine whether the reference radio resource group is the first resource subgroup or the second resource subgroup; the first resource subgroup comprises radio resources on the second serving cell.

The present disclosure provides a method in a second node for wireless communications, comprising:

- transmitting a reference signal group respectively on each serving cell in a first cell group; and
- receiving a target signal in a target radio resource group;
- herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

According to one aspect of the present disclosure, comprising:

- transmitting a response to the target signal in a reference radio resource group;
- herein, the reference radio resource group belongs to a first time window in time domain, and the target radio resource group is used to determine the first time window.

According to one aspect of the present disclosure, wherein when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

According to one aspect of the present disclosure, wherein when the target cell is the first serving cell and the link failure does not occur in the second serving cell, the reference radio resource group comprises radio resources on the second serving cell; when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

According to one aspect of the present disclosure, wherein a measurement performed on at least one reference signal resource in the reference signal group on the second serving cell is used to determine whether a link failure occurs on the first serving cell.

According to one aspect of the present disclosure, wherein the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell.

According to one aspect of the present disclosure, wherein when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

According to one aspect of the present disclosure, wherein when the target cell is the first serving cell, the reference air interface resource group is a first resource subgroup or a second resource subgroup, the first reference signal subgroup corresponds to the first resource subgroup, and the second reference signal subgroup corresponds to the second resource subgroup; whether a link failure is corresponding to the first reference signal subgroup or the second reference signal subgroup is used to determine whether the reference radio resource group is the first resource subgroup or the second resource subgroup; the first resource subgroup comprises radio resources on the second serving cell.

The present disclosure provides a first node for wireless communications, comprising:

- a first receiver, receiving a reference signal group respectively on each serving cell in a first cell group; and
- a first transmitter, transmitting a target signal in a target radio resource group;
- herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

The present disclosure provides a second node for wireless communications, comprising:

- a second transmitter, transmitting a reference signal group respectively on each serving cell in a first cell group; and
- a second receiver, receiving a target signal in a target radio resource group;
- herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the present disclosure has the following advantages over conventional schemes:

- a serving cell with a beam failure is quickly identified and beam communications on which are quickly recovered.
- the PCell or the PSCell, and the SCell allowed to cross-schedule the PCell or the PSCell with beam failures are quickly identified, and beam communications on which are quickly recovered.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
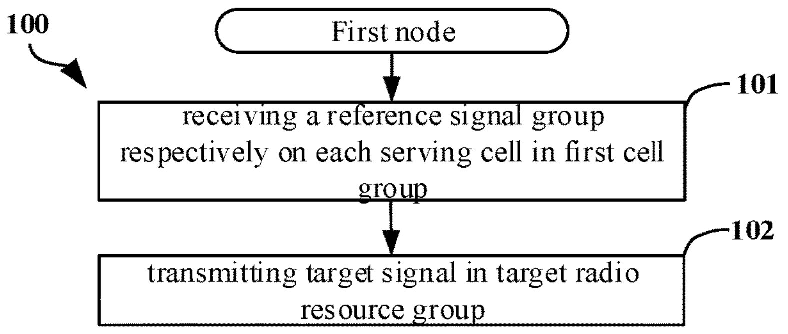
FIG. 1 illustrates a flowchart of a target signal according to one embodiment of the present disclosure.

Embodiment 1 illustrates a flowchart of a target signal according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In embodiment 1, the first node in the present disclosure receives a reference signal respectively on each serving cell in a first cell group in step 101; transmits a target signal in a target radio resource group in step 102; herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the first cell group is maintained by a node.

In one embodiment, the first cell group is maintained by the second node.

In one embodiment, the first cell group is maintained by a base station.

In one embodiment, frequency-domain resources occupied by any two serving cells in the first cell group are not completely overlapped.

In one embodiment, cell identifiers (ID) of any two serving cells in the first cell group are different.

In one embodiment, the cell ID is an ID of a serving cell in a cell group.

In one embodiment, the cell ID is a non-negative integer not greater than 32.

In one embodiment, the cell ID is a Physical Cell ID (PCI).

In one embodiment, a number of the other serving cells comprised on the first serving cell is greater than 1.

In one embodiment, a number of the other serving cells comprised on the first serving cell is equal to 1.

In one embodiment, a number of the other serving cells comprised on the first serving cell does not exceed 30.

In one embodiment, the first cell group comprises a serving cell in which a number of the first nodes is greater than 1.

In one embodiment, any serving cell in the first cell group is a serving cell of the first node.

In one embodiment, the first cell group comprises a Master Cell Group (MCG).

In one embodiment, the first cell group is a subset of an MCG.

In one embodiment, the first cell group comprises a Secondary Cell Group (SCG).

In one embodiment, the first cell group is a subset of an SCG.

In one embodiment, the first serving cell is a Primary Cell (PCell).

In one embodiment, the first serving cell is a Primary SCG Cell (PSCell).

In one embodiment, the first serving cell is a Special Cell (SpCell).

In one embodiment, the second serving cell is a Secondary Cell (SCell).

In one embodiment, the other serving cell is an SCell.

In one embodiment, the other serving cell is an SCell different from the first serving cell and the second serving cell.

In one embodiment, the first serving cell is only allowed to be self-scheduled.

In one embodiment, the first serving cell is allowed to self-schedule or cross-schedule any serving cell other than the first serving cell in the first cell group.

In one embodiment, a physical channel on the first serving cell is self-scheduled by the first serving cell or cross-scheduled by the second serving cell.

In one embodiment, a PDSCH on the first serving cell is self-scheduled by the first serving cell or cross-scheduled by the second serving cell.

In one embodiment, the second serving cell is a serving cell allowed to cross-schedule the first serving cell.

In one embodiment, the second serving cell is allowed to be self-scheduled.

In one embodiment, the second serving cell is allowed to cross-schedule at least one the other serving cell in the first cell group.

In one embodiment, the other serving cell can only be self-scheduled.

In one embodiment, the other serving cell is not allowed to cross schedule the second serving cell.

In one embodiment, the other serving cell is not used to cross-schedule the first serving cell.

In one embodiment, the link failure comprises a Beam Failure (BF).

In one embodiment, the link failure comprises a BFI_COUNTER>=beamFailureInstanceMaxCount.

In one embodiment, the link failure comprises a Radio Link Failure (RLF).

In one embodiment, the link failure comprises a downlink control channel failure of the first serving cell.

In one embodiment, the link failure comprises a PDCCH failure of the first serving cell.

In one embodiment, the link failure comprises a self-scheduling failure of the first serving cell.

In one embodiment, the link failure comprises failures in both self-scheduling of the first serving cell and cross-scheduling of the second serving cell.

In one embodiment, the reference signal group on the given cell comprises at least one reference signal.

In one embodiment, the reference signal comprises at least one of a CSI-RS, an SRS, or an SS/PBCH.

In one embodiment, the reference signal comprises at least one of a CSI-RS or an SS/PBCH.

In one embodiment, the measurement performed on the reference signal group on the given cell is used to judge whether a value of a first counter is not less than a first threshold; whether the first counter is not less than the first threshold is used to determine that whether a link failure occurs on the given cell.

In one embodiment, a radio link quality determined by the measurement performed on the reference signal group on the given cell being worse than a target threshold is used to trigger reporting a first-type indication from a physical layer to a higher layer; the higher layer receiving the first-type indication is used to determine whether a link failure occurs on the given cell.

In one embodiment, a radio link quality determined by the measurement performed on the reference signal group on the given cell being worse than a target threshold is used to trigger reporting a first-type indication from a physical layer to a higher layer; the higher layer adds 1 to a value of a first counter each time it receives the first-type indication, and whether the first counter is not less than a first threshold is used to determine whether a link failure occurs on the given cell.

In one embodiment, the radio link quality determined by the measurement performed on the reference signal group on the given cell is only for a radio link quality measured by the reference signal group on the given cell.

In one embodiment, the radio link quality determined by the measurement performed on the reference signal on the given cell is completely determined by a measurement performed on the reference signal group on the given cell.

In one embodiment, whether the radio link quality determined by the measurement performed on the reference signal on the given cell being completely determined by a measurement performed on the reference signal group on the given cell is related to the given cell is which of the first serving cell, the second serving cell and the other serving cell.

In one embodiment, whether the radio link quality determined by the measurement performed on the reference signal on the given cell being completely determined by a measurement performed on the reference signal group on the given cell is related to whether the given cell is the first serving cell.

In one embodiment, the radio link quality determined by the measurement performed on the reference signal on the first serving cell is not completely determined by a measurement performed on the reference signal group on the first serving cell.

In one embodiment, the radio link quality determined by the measurement performed on the reference signal on the first serving cell is determined by measurements performed on the reference signal group and other reference signals on the first serving cell together, and the other reference signals are reference signals other than the reference signal group.

In one embodiment, the radio link quality determined by the measurement performed on the reference signal group on the first serving cell is determined by the measurement performed on the reference signal group on the first serving cell and a measurement performed on at least one reference signal resource in the reference signal group on the second serving cell together.

In one embodiment, when the given cell is any serving cell other than the first serving cell, the radio link quality determined by the measurement performed on the reference signal group on the given cell is completely determined by a measurement performed on the reference signal group on the given cell.

In one embodiment, the radio link quality is one of RSRP, L1-RSRP, SINR, and L1-SINR; the meaning of the phrase that the radio link quality is worse than a target threshold includes: the radio link quality is worse than the target threshold; the meaning of the phrase that the radio link quality is not worse than a target threshold includes: the radio link quality is not worse than the target threshold.

In one embodiment, the radio link quality is BLER; the meaning of the phrase that the radio link quality is worse than a target threshold includes: the radio link quality is greater than the target threshold; and the meaning of the phrase that the radio link quality is not worse than a target threshold includes: the radio link quality is not greater than the target threshold.

In one embodiment, the radio link quality is RSRP, and the radio link quality is determined for a measurement performed on a given reference signal group; the meaning of the phrase that the radio link quality is less than the target threshold includes: RSRP of each reference signal in the given reference signal group is less than the target threshold; the meaning of the phrase that the radio link quality is not less than the target threshold includes: RSRP of at least one reference signal in the given reference signal group is not less than the target threshold.

In one embodiment, the radio link quality is L1-RSRP, and the radio link quality is determined for a measurement performed on a given reference signal group; the meaning of the phrase that the radio link quality is less than the target threshold includes: L1-RSRP of each reference signal in the given reference signal group is less than the target threshold; the meaning of the phrase that the radio link quality is not less than the target threshold includes: L1-RSRP of at least one reference signal in the given reference signal group is not less than the target threshold.

In one embodiment, the radio link quality is SINR, and the radio link quality is determined for a measurement performed on a given reference signal group; the meaning of the phrase that the radio link quality is less than the target threshold includes: SINR of each reference signal in the given reference signal group is less than the target threshold; the meaning of the phrase that the radio link quality is not less than the target threshold includes: SINR of at least one reference signal in the given reference signal group is not less than the target threshold.

In one embodiment, the radio link quality is L1-SINR, and the radio link quality is determined for a measurement performed on a given reference signal group; the meaning of the phrase that the radio link quality is less than the target threshold includes: L1-SINR of each reference signal in the given reference signal group is less than the target threshold; the meaning of the phrase that the radio link quality is not less than the target threshold includes: L1-SINR of at least one reference signal in the given reference signal group is not less than the target threshold.

In one embodiment, the radio link quality is BLER, and the radio link quality is determined for a measurement performed on a given reference signal group; the meaning of the phrase that the radio link quality is greater than the target threshold includes: BLER of each reference signal in the given reference signal group is greater than the target threshold; the meaning of the phrase that the radio link quality is not greater than the target threshold includes: BLER of at least one reference signal in the given reference signal group is not greater than the target threshold.

In one embodiment, the radio link quality determined by a measurement performed on a given reference signal group comprises RSRP obtained by a measurement performed on the given reference signal group.

In one embodiment, the radio link quality determined by a measurement performed on a given reference signal group comprises L1-RSRP obtained by a measurement performed on the given reference signal group.

In one embodiment, the radio link quality determined by a measurement performed on a given reference signal group comprises SINR obtained by a measurement performed on the given reference signal group.

In one embodiment, the radio link quality determined by a measurement performed on a given reference signal group comprises L1-SINR obtained by a measurement performed on the given reference signal group.

In one embodiment, the radio link quality determined by a measurement performed on a given reference signal group comprises BLER obtained by a measurement performed on the given reference signal group.

In one embodiment, the radio link quality determined by a measurement performed on a given reference signal group is obtained by table looking-up of RSRP, L1-RSRP, SINR or L1-SINR of the given reference signal group.

In one embodiment, the radio link quality is obtained according to hypothetical PDCCH transmission parameters.

In one embodiment, the specific meaning of the hypothetical PDCCH transmission parameters can be found in 3GPP TS38.133.

In one embodiment, the target threshold is a real number.

In one embodiment, the target threshold is a non-negative real number.

In one embodiment, the target threshold is a non-negative real number not greater than 1.

In one embodiment, the target threshold is one of $Q_{out\_L}$, $Q_{out\_LR\_SSB}$ and $Q_{out\_LR\_CSI\text{-}RS}$.

In one embodiment, the specific meanings of the $Q_{out\_LR}$, $Q_{out\_LR\_SSB}$ and $Q_{out\_LR\_CSI\text{-}RS}$ can be found in 3GPP TS38.133.

In one embodiment, the target threshold is determined by a higher-layer parameter rlmInSyncOutOfSyncThreshold.

In one embodiment, when the first counter is not less than the first threshold, a link failure occurs on the given cell.

In one embodiment, when the first counter is less than the first threshold, a link failure does not occur on the given cell.

In one embodiment, the first-type indication is a beam failure instance indication.

In one embodiment, the first-type indication is a radio link quality indication.

In one embodiment, reporting of the first-type indication is periodic.

In one embodiment, the first counter is BFI_COUNTER.

In one embodiment, an initial value of the first counter is 0.

In one embodiment, an initial value of the first counter is a positive integer.

In one embodiment, a value of the first counter is a non-negative integer.

In one embodiment, the first threshold is a positive integer.

In one embodiment, the first threshold is beamFailureInstanceMaxCount.

In one embodiment, the first threshold is configured by a higher-layer parameter.

In one embodiment, a higher-layer parameter configuring the first threshold comprise all or partial information in a beamFailureInstanceMaxCount field of a RadioLinkMonitoringConfig IE.

In one embodiment, the higher layer starts or restarts a first timer each time it receives the first-type indication, and increases the first counter by 1.

In one embodiment, the first timer is beamFailureDetectionTimer.

In one embodiment, when the first timer expires, the first counter is cleared.

In one embodiment, an initial value of the first timer is a positive integer.

In one embodiment, an initial value of the first timer is a positive real number.

In one embodiment, an initial value of the first counter is measured by $Q_{out,LR}$ reporting period of a beam failure detection RS.

In one embodiment, an initial value of the first timer is configured by a higher-layer parameter beamFailureDetectionTimer.

In one embodiment, an initial value of the first timer is configured by an IE.

In one embodiment, a name of IE configuring an initial value of the first timer comprises RadioLinkMonitoring.

In one embodiment, the phrase that the link failure on a target cell is used to trigger the target signal includes: if the link failure does not occur on the target cell, the first node drops transmitting the target signal in the target radio resource group.

In one embodiment, the measurement performed on the reference signal group on the given cell is used to judge whether a value of a first counter is not less than a first threshold; whether the first counter is not less than the first threshold is used to determine whether a link failure occurs on the given cell.

In one embodiment, a radio link quality determined by the measurement performed on the reference signal group on the given cell being worse than a target threshold is used to trigger reporting a first-type indication from a physical layer to a higher layer; the higher layer receiving the first-type indication is used to determine whether a link failure occurs on the given cell.

In one embodiment, a radio link quality determined by the measurement performed on the reference signal group on the given cell being worse than a target threshold is used to trigger reporting a first-type indication from a physical layer to a higher layer; the higher layer adds 1 to a value of a first counter each time it receives the first-type indication, and whether the first counter is not less than a first threshold is used to determine whether a link failure occurs on the given cell.

In one embodiment, the target cell is the first serving cell, a radio link quality determined by the measurement performed on the reference signal group on the target cell being worse than a target threshold is used to trigger reporting a first-type indication from a physical layer to a higher layer; the higher layer receiving the first-type indication is used to trigger the target signal.

In one embodiment, the target cell is the first serving cell, a radio link quality determined by the measurement performed on the reference signal group on the target cell being worse than a target threshold is used to trigger reporting a first-type indication from a physical layer to a higher layer; the higher layer adds 1 to a value of a first counter each time it receives the first-type indication, and the first counter reaching a first threshold is used to trigger the target signal.

In one embodiment, the target cell is the second serving cell, a radio link quality determined by the measurement performed on the reference signal group on the target cell being worse than a target threshold is used to trigger reporting a first-type indication from a physical layer to a higher layer; the higher layer receiving the first-type indication is used to trigger the target signal.

In one embodiment, the target cell is the second serving cell, a radio link quality determined by the measurement performed on the reference signal group on the target cell being worse than a target threshold is used to trigger reporting a first-type indication from a physical layer to a higher layer; the higher layer adds 1 to a value of a first counter each time it receives the first-type indication, and the first counter reaching a first threshold is used to trigger the target signal.

In one embodiment, the target cell is the second serving cell, a radio link quality determined by the measurement performed on the reference signal group on the target cell being worse than a target threshold is used to trigger reporting a first-type indication from a physical layer to a higher layer; the higher layer receiving the first-type indication is used to trigger a generation of a first message, and the generation of the first message is used to trigger the target signal.

In one embodiment, the target cell is the second serving cell, a radio link quality determined by the measurement performed on the reference signal group on the target cell being worse than a target threshold is used to trigger reporting a first-type indication from a physical layer to a higher layer; the higher layer adds 1 to a value of a first counter each time it receives the first-type indication, and the first counter reaching a first threshold is used to trigger a generation of a first message, and the generation of the first message is used to trigger the target signal.

In one embodiment, the target cell is any the other serving cell in the first cell group, a radio link quality determined by the measurement performed on the reference signal group on the target cell being worse than a target threshold is used to trigger reporting a first-type indication from a physical layer to a higher layer; the higher layer receiving the first-type indication is used to trigger a generation of a first message, and the generation of the first message is used to trigger the target signal.

In one embodiment, the target cell is any the other serving cell in the first cell group, a radio link quality determined by the measurement performed on the reference signal group on the target cell being worse than a target threshold is used to trigger reporting a first-type indication from a physical layer to a higher layer; the higher layer adds 1 to a value of a first counter each time it receives the first-type indication, and the first counter reaching a first threshold is used to trigger a generation of a first message, and the generation of the first message is used to trigger the target signal.

In one embodiment, the first message comprises a MAC CE.

In one embodiment, the first message comprises a PUSCH MAC CE.

In one embodiment, the first message comprises a Beam Failure Recovery (BFR) MAC CE.

In one embodiment, the first message comprises a Truncated BFR MAC CE.

In one embodiment, when a random access procedure corresponding to the target signal ends successfully, the first counter is cleared.

In one embodiment, the target radio resource group comprises at least one Resource Element (RE) in time-frequency domain.

In one embodiment, the target radio resource group comprises at least one radio resource.

In one embodiment, the radio resources comprise time-domain resources and frequency-domain resources.

In one embodiment, the radio resource group comprises time-domain resources and frequency-domain resources.

In one embodiment, the radio resource set comprises time-domain resources and frequency-domain resources.

In one embodiment, the radio resource block comprises time-domain resources and frequency-domain resources.

In one embodiment, the radio resources comprise time-domain resources, frequency-domain resources and code-domain resources.

In one embodiment, the radio resource group comprises time-domain resources, frequency-domain resources and code-domain resources.

In one embodiment, the radio resource set comprises time-domain resources, frequency-domain resources and code-domain resources.

In one embodiment, the radio resource block comprises time-domain resources, frequency-domain resources and code-domain resources.

In one embodiment, the radio resources comprise time-domain resources, frequency-domain resources and a preamble.

In one embodiment, the radio resource group comprises time-domain resources, frequency-domain resources and a preamble.

In one embodiment, the radio resource set comprises time-domain resources, frequency-domain resources and a preamble.

In one embodiment, the radio resource block comprises time-domain resources, frequency-domain resources and a preamble.

In one embodiment, the target signal comprises a first characteristic sequence.

In one embodiment, the target signal comprises a Random Access Preamble.

In one embodiment, the target signal comprises a scheduling request.

In one embodiment, the target signal comprises a scheduling request triggered by the first message.

In one embodiment, the target signal carries a first message.

In one embodiment, the target signal comprises a scheduling request and a first message.

In one embodiment, the target radio resource group comprises at least PRACH resources in PRACH resources or radio resources occupied by a PUSCH scheduled by a Random Access Response (RAR) UL grant.

In one embodiment, the target radio resource group comprises PRACH resources.

In one embodiment, the target radio resource group comprises PRACH resources and radio resources occupied by a PUSCH scheduled by an RAR UL grant.

In one embodiment, the target radio resource group comprises at least PUCCH resources in PUCCH resources or PUSCH resources.

In one embodiment, the target radio resource group comprises PUCCH resources.

In one embodiment, PUCCH resources comprised in the target radio resource group is used for a Link Recovery Request (LRR).

In one embodiment, PUSCH resources comprised in the target radio resource group is used for carrying a first message.

In one embodiment, the target radio resource group comprises PUCCH resources and PUSCH resources.

In one embodiment, the target radio resource group is configured by a higher-layer parameter.

In one embodiment, the target radio resource group is configured by a PRACH-ResourceDedicatedBFR.

In one embodiment, the target radio resource group is configured by schedulingRequestID-BFR-SCell-r16.

In one embodiment, when the target cell is the first serving cell, the target radio resource group is configured by PRACH-ResourceDedicatedBFR.

In one embodiment, when the target cell is the second serving cell, the target radio resource group is configured by schedulingRequestID-BFR-SCell-r16.

In one embodiment, when the target cell is the other serving cell, the target radio resource group is configured by schedulingRequestID-BFR-SCell-r16.

In one embodiment, the target radio resource group comprises a first radio resource block and a second radio resource block, the target signal comprises a first sub-signal and a second sub-signal, the first radio resource block comprises radio resources occupied by the first sub-signal, and the second radio resource block comprises radio resources occupied by the second sub-signal.

In one embodiment, the first sub-signal comprises a first characteristic sequence.

In one embodiment, the first sub-signal comprises a Random Access Preamble.

In one embodiment, the first sub-signal comprises a scheduling request.

In one embodiment, the first sub-signal comprises a scheduling request triggered by the first message.

In one embodiment, the second sub-signal comprises a Medium Access Control layer Control Element (MAC CE).

In one embodiment, the second sub-signal comprises a Beam Failure Recovery (BFR) MAC CE.

In one embodiment, the second sub-signal comprises a Truncated BFR MAC CE.

In one embodiment, the second sub-signal carries a first message.

In one embodiment, the first sub-signal comprises Msg1, and the second sub-signal comprises Msg3 PUSCH.

In one embodiment, the first sub-signal comprises Msg1, and the second sub-signal comprises a PUSCH scheduled by an RAR UL grant.

In one embodiment, the target signal comprises MsgA, the first sub-signal comprises a random access preamble in MsgA, and the second sub-signal comprises a PUSCH in MsgA.

In one embodiment, the first radio resource block comprises PRACH resources.

In one embodiment, the first radio resource block comprises a PRACH-ResourceDedicatedBFR.

In one embodiment, the first radio resource block comprises PUCCH resources.

In one embodiment, the second radio resource block comprises PUSCH resources.

In one embodiment, the first radio resource block comprises PUCCH resources used for an LRR.

In one embodiment, the second radio resource block comprises PUSCH resources used for carrying a first message.

In one embodiment, when the target cell is the second serving cell, the first radio resource block is configured by schedulingRequestID-BFR-SCell-r16.

In one embodiment, when the target cell is the other serving cell, the first radio resource block is configured by schedulingRequestID-BFR-SCell-r16.

In one embodiment, only the target radio resource group in the target radio resource group and the target signal is used to indicate that the target cell is one of three possibilities of the first serving cell, the second serving cell and the other serving cell.

In one subembodiment of the above embodiment, the target radio resource group belongs to one of a first radio resource set, a second radio resource set and a third radio resource set; when the target radio resource group belongs to the first radio resource set, the target cell is the first serving cell; when the target radio resource group belongs to the second radio resource set, the target cell is the second serving cell; when the target radio resource group belongs to the third radio resource set, the target cell is the other serving cell.

In one embodiment, the target radio resource group and the target signal are used together to indicate that the target cell is one of three possibilities of the first serving cell, the second serving cell and the other serving cell.

In one subembodiment of the above embodiment, the target radio resource group belongs to a first radio resource set or a second radio resource set; when the target radio resource group belongs to the first radio resource set, the target cell is the first serving cell; when the target radio resource group belongs to the second radio resource set, the target signal is used to indicate that the target cell is the second serving cell or the other serving cell.

In one subembodiment of the above embodiment, the target radio resource group belongs to one of a first radio resource set and a second radio resource set; when the target radio resource group belongs to the first radio resource set, the target signal is used to indicate that the target cell is the first serving cell or the second serving cell; when the target radio resource group belongs to the second radio resource set, the target cell is the other serving cell.

In one subembodiment of the above embodiment, the target signal comprises a first subsignal and a second subsignal, and the first subsignal is used to indicate the target signal.

In one subembodiment of the above embodiment, the target signal comprises a first subsignal and a second subsignal, and the second subsignal is used to indicate the target signal.

In one subembodiment of the above embodiment, a preamble comprised in the target signal is used to indicate the target cell.

In one subembodiment of the above embodiment, an RS sequence of a DMRS comprised in the target signal is used to indicate the target cell.

In one subembodiment of the above embodiment, an information bit comprised in the target signal is used to indicate the target cell.

In one subembodiment of the above embodiment, an Orthogonal Covering Code (OCC) comprised in the target signal is used to indicate the target cell.

In one embodiment, the first radio resource set comprises Contention Free Random Access (CFRA) resources.

In one embodiment, the first radio resource set comprises Contention Based Random Access (CBRA) resources.

In one embodiment, the first radio resource set comprises Physical Random Access CHannel (PRACH) resources.

In one embodiment, the first radio resource set comprises at least PRACH resources in PRACH resources or radio resources occupied by a PUSCH scheduled by an RAR UL grant.

In one embodiment, the first radio resource set comprises PRACH resources and radio resources occupied by a PUSCH scheduled by an RAR UL grant.

In one embodiment, the first radio resource group comprises at least radio resources occupied by Msg1 in radio resources occupied by Msg1 or radio resources occupied by Msg3 PUSCH.

In one embodiment, the first radio resource group comprises at least radio resources occupied by Msg1 in radio resources occupied by Msg1 or radio resources occupied by a PUSCH scheduled by an RAR UL grant.

In one embodiment, the first radio resource group comprises radio resources occupied by Msg1 and radio resources occupied by Msg3 PUSCH.

In one embodiment, the first radio resource group comprises radio resources occupied by Msg1 or radio resources occupied by a PUSCH scheduled by an RAR UL grant.

In one embodiment, the second radio resource set comprises Contention Free Random Access (CFRA) resources.

In one embodiment, the second radio resource set comprises Contention Based Random Access (CBRA) resources.

In one embodiment, the second radio resource set comprises Physical Random Access CHannel (PRACH) resources.

In one embodiment, the second radio resource set comprises at least PRACH resources in PRACH resources or radio resources occupied by a PUSCH scheduled by an RAR UL grant.

In one embodiment, the second radio resource set comprises PRACH resources and radio resources occupied by a PUSCH scheduled by an RAR UL grant.

In one embodiment, the second radio resource group comprises at least radio resources occupied by Msg1 of radio resources occupied by Msg1 or radio resources occupied by Msg3 PUSCH.

In one embodiment, the second radio resource group comprises at least radio resources occupied by Msg1 in radio resources occupied by Msg1 or radio resources occupied by a PUSCH scheduled by an RAR UL grant.

In one embodiment, the second radio resource group comprises radio resources occupied by Msg1 and radio resources occupied by Msg3 PUSCH.

In one embodiment, the second radio resource group comprises radio resources occupied by Msg1 and radio resources occupied by a PUSCH scheduled by an RAR UL grant.

In one embodiment, the second radio resource group comprises at least PUCCH resources in PUCCH resources or PUSCH resources.

In one embodiment, the second radio resource group comprises PUCCH resources.

In one embodiment, the second radio resource group comprises PUCCH resources and PUSCH resources.

In one embodiment, PUCCH resources comprised in the second radio resource group is used for an LRR.

In one embodiment, PUSCH resources comprised in the second radio resource group is used for carrying a first message.

In one embodiment, the third radio resource group comprises at least PUCCH resources in PUCCH resources or PUSCH resources.

In one embodiment, the third radio resource group comprises PUCCH resources.

In one embodiment, the third radio resource group comprises PUCCH resources and PUSCH resources.

In one embodiment, PUCCH resources comprised in the third radio resource group is used for an LRR.

In one embodiment, PUSCH resources comprised in the third radio resource group is used for carrying a first message.

In one embodiment, the first radio resource set comprises at least one radio resource, and the second radio resource set comprises at least one radio resource.

In one embodiment, the third radio resource set comprises at least one radio resource.

Embodiment 2

Figure 2:
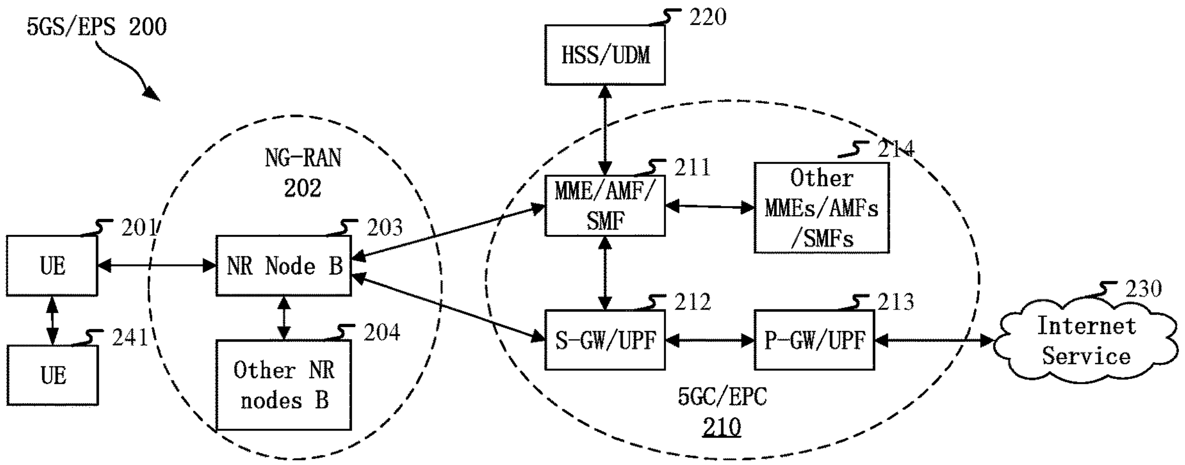
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the UE 241.

In one embodiment, the second node in the present disclosure comprises the gNB 203.

Embodiment 3

Figure 3:
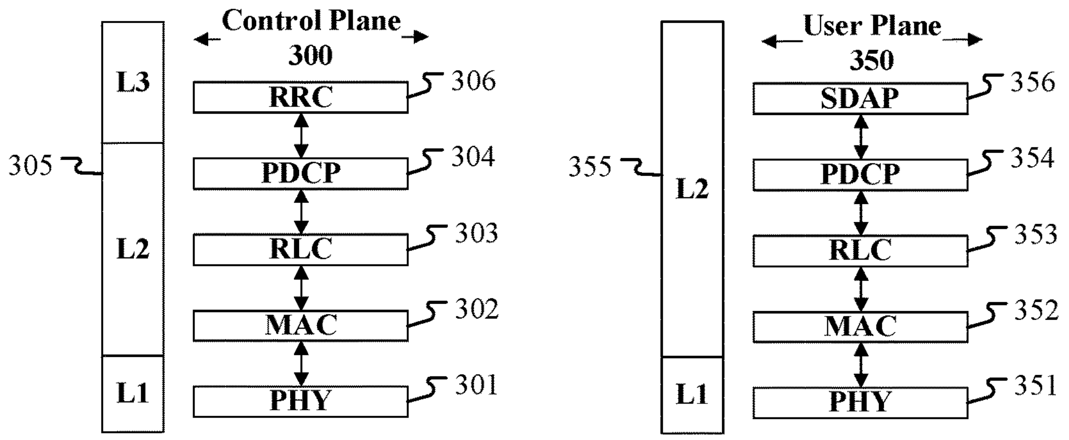
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, gNB or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3(L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the reference signal received in any serving cell in the first cell group is generated by the PHY 301 or the PHY 351.

In one embodiment, the target signal is generated by the PHY 301 or the PHY 351.

In one embodiment, the response for the target signal is generated by the PHY 301 or the PHY 351.

Embodiment 4

Figure 4:
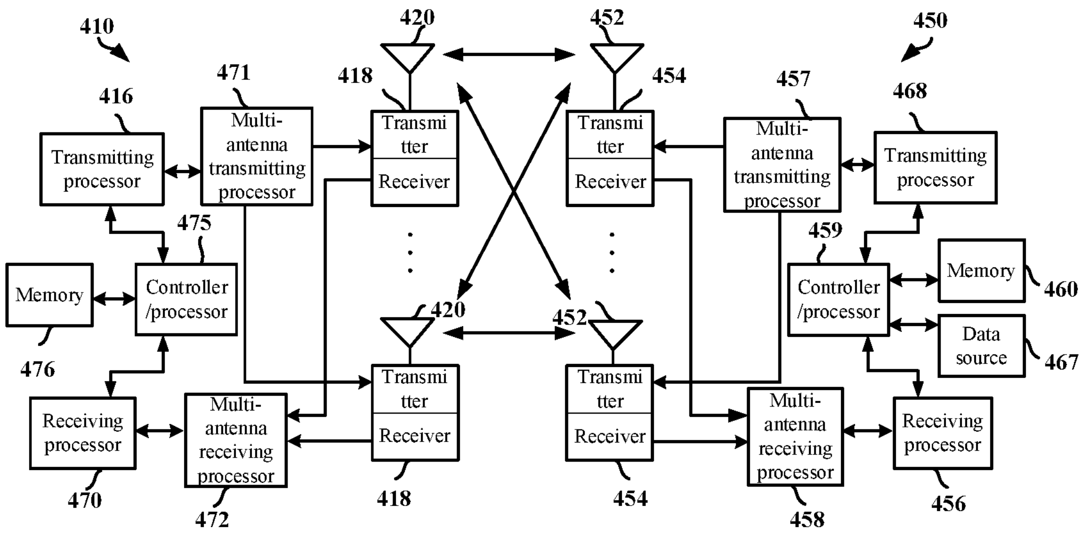
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In DL transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a reference signal group respectively on each serving cell in a first cell group; and transmits a target signal in a target radio resource group; herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the second communication device 450 comprises a memory that stores a computer readable instruction program. The computer readable instruction program generates an action when executed by at least one processor. The action includes: receiving a reference signal group respectively on each serving cell in a first cell group; and transmitting a target signal in a target radio resource group; herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a reference signal group respectively on each serving cell in a first cell group; and receives a target signal in a target radio resource group; herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the first communication device 410 comprises a memory that stores a computer readable instruction program. The computer readable instruction program generates an action when executed by at least one processor. The action includes: transmitting a reference signal group respectively on each serving cell in a first cell group; and receiving a target signal in a target radio resource group; herein, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the first node comprises the second communication device 450 in the present disclosure.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the reference signal group respectively on each serving cell in the first cell group in the present disclosure.

In one embodiment, at least one of the antenna 420, the transmitter 418, the transmitting processor 416, the multi-antenna transmitting processor 471, the controller/processor 475, or the memory 476 is used to transmit the reference signal group respectively on each serving cell in the first cell group in the present disclosure.

In one embodiment, at least one of the antenna 452, the receiver 454, the receiving processor 456, the multi-antenna receiving processor 458, the controller/processor 459, the memory 460, or the data source 467 is used to monitor a response to the target signal in the reference radio resource group in the present disclosure.

In one embodiment, at least one of the antenna 420, the transmitter 418, the transmitting processor 416, the multi-antenna transmitting processor 471, the controller/processor 475, or the memory 476 is used to transmit a response to the target signal in the reference radio resource group in the present disclosure.

In one embodiment, at least one of the antenna 452, the transmitter 454, the transmitting processor 468, the multi-antenna transmitting processor 457, the controller/processor 459, or the memory 460 is used to transmit the target signal in the target radio resource group in the present disclosure.

In one embodiment, at least one of the antenna 420, the receiver 418, the receiving processor 470, the multi-antenna receiving processor 472, the controller/processor 475, or the memory 476 is used to receive the target signal in the target radio resource group in the present disclosure.

Embodiment 5

Figure 5:
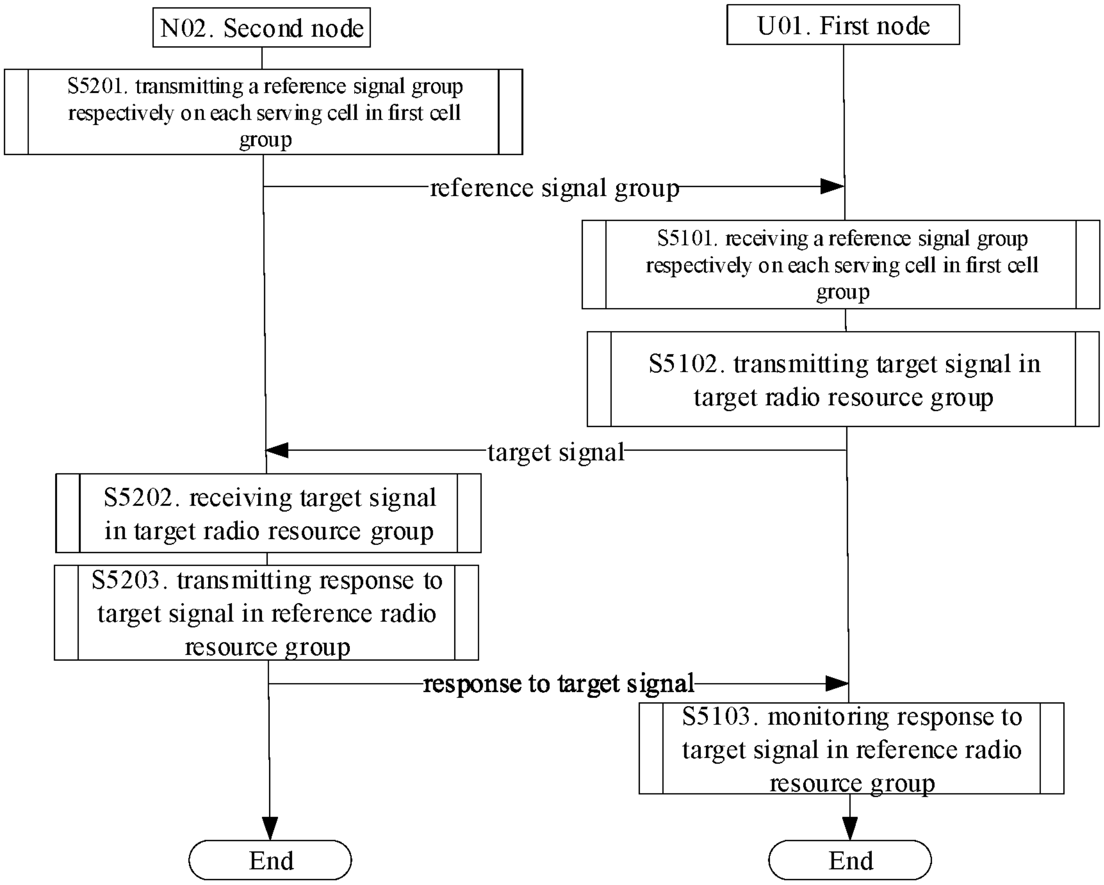
FIG. 5 illustrates a flowchart of wireless transmission according to one embodiment of the present disclosure.

Embodiment 5 illustrates a flowchart of wireless transmission according to one embodiment in the present disclosure, as shown in FIG. 5. In FIG. 5, a first node U01 and a second node N02 are communication nodes transmitted via an air interface.

The first node U01 receives a reference signal group respectively on each serving cell in a first cell group in step S5101; transmits a target signal in a target radio resource group in step S5102; and monitors a response to the target signal in a reference radio resource group in step S5103;

The second node N02 transmits a reference signal group respectively on each serving cell in a first cell group; receives a target signal in a target radio resource group in step S5202; and transmits a response to the target signal in a reference radio resource group in step S5203;

In embodiment 5, the first cell group comprises a first serving cell, a second serving cell and at least one other serving cell; a given cell is any serving cell in the first cell group, a measurement performed on the reference signal group on the given cell is used by the first node U01 to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cells; the reference radio resource group belongs to a first time window in time domain, and the target radio resource group is used to determine the first time window.

In one embodiment, the target radio resource group is used by the first node U01 to determine the first time window.

In one embodiment, the target radio resource group is used by the second node N02 to determine the first time window.

In one embodiment, a method in the first node comprises:

receiving a first signaling;

herein, the first signaling is used to indicate the first cell group.

In one subembodiment of the above embodiment, the first signaling is used to indicate the reference signal group on each serving cell in the first cell group.

In one subembodiment of the above embodiment, the first signaling is used to indicate a target radio resource group.

In one subembodiment of the above embodiment, the first signaling is used to indicate the reference radio resource group.

In one subembodiment of the above embodiment, the first signaling is a higher-layer signaling.

In one subembodiment of the above embodiment, the first signaling is an RRC signaling.

In one embodiment, the reference radio resource group comprises at least one RE in time-frequency domain.

In one embodiment, the reference radio resource group comprises at least one radio resource.

In one embodiment, the reference radio resource group comprises a search space.

In one embodiment, the reference radio resource group comprises a search space set.

In one embodiment, the reference radio resource group comprises one or a plurality of Physical Downlink Control Channel (PDCCH) candidates.

In one embodiment, the reference radio resource group comprises a COntrol REsource SET (CORESET).

In one embodiment, a search space set to which the reference radio resource group belongs is identified by a recovery SearchSpaceId.

In one embodiment, an index of a search space set to which the reference radio resource group belongs is equal to 0.

In one embodiment, a search space set to which the reference radio resource group belongs comprises a Type1-PDCCH Common search space (CSS) set.

In one embodiment, the reference radio resource group belongs to a PDCCH CSS set.

In one embodiment, the response to the target signal comprises a MAC CE activation command for a TCI state.

In one embodiment, the response to the target signal comprises a MAC CE activation command for any parameter in tci-StatesPDCCH-ToAddList and/or tci-StatesPDCCH-ToReleaseList.

In one embodiment, the response to the target signal comprises a MAC CE for indicating a PDCCH TCI.

In one embodiment, the response to the target signal comprises an RRC signaling used for configuring CORESET TCI-state.

In one embodiment, the response to the target signal comprises Downlink control information (DCI).

In one embodiment, the response to the target signal comprises a physical layer signaling.

In one embodiment, the response to the target signal is transmitted on a PDCCH.

In one embodiment, the response to the target signal comprises Msg4.

In one embodiment, the response to the target signal comprises a Contention Resolution PDSCH.

In one embodiment, a CRC of the response to the target signal is scrambled by a C-RNTI or a Modulation and Coding Scheme (MCS)-C-RNTI.

In one embodiment, a CRC of the response to the target signal is scrambled by a TC-RNTI.

In one embodiment, a CRC of the response to the target signal is scrambled by a C-RNTI.

In one embodiment, a CRC of the response to the target signal is scrambled by a MsgB-RNTI.

In one embodiment, a CRC of the response to the target signal is scrambled by a Random Access (RA)-RNTI.

In one embodiment, the first node detects the response to the target signal in the first time window, and the first counter is cleared.

In one embodiment, the target signal comprises a PUSCH carrying the first message, and a Hybrid Automatic Repeat reQuest (HARQ) process number of the PUSCH carrying the first message is a first HARQ process number; and the response to the target signal is PUSCH scheduling DCI indicating the first HARQ process number and a toggled NDI field value.

In one embodiment, the second sub-signal comprises a PUSCH carrying the first message, and a HARQ process number of the second sub-signal is a first HARQ process number; the response to the target signal is PUSCH scheduling DCI indicating the first HARQ process number and a toggled NDI field value.

In one embodiment, a TCI state is used to indicate at least one reference signal.

In one embodiment, a reference signal indicated by a TCI state comprises at least one of a CSI-RS, an SRS, or an SS/PBCH block.

In one embodiment, a TCI state is used to indicate a reference signal whose type is QCL-TypeD.

In one embodiment, the specific meaning of the QCL-TypeD can be found in 3GPP TS38.214, section 5.1.5.

In one embodiment, a reference signal indicated by a TCI state is used to determine a Quasi-Co-Located (QCL) parameter.

In one embodiment, the QCL parameter comprises a Spatial filter.

In one embodiment, the QCL parameter comprises a Spatial Rx parameter.

In one embodiment, the QCL parameter comprises a Spatial Tx parameter.

In one embodiment, a type of the QCL comprises QCL-TypeD.

In one embodiment, the Spatial Tx parameters comprise one or more of a transmitting antenna port, a transmitting antenna port group, a transmitting beam, a transmitting analog beamforming matrix, a transmitting analog beamforming vector, a transmitting beamforming matrix, a transmitting beamforming vector and a spatial-domain transmission filter.

In one embodiment, the Spatial Rx parameters comprise one or more of a receiving beam, a receiving analog beamforming matrix, a receiving analog beamforming vector, a receiving beamforming matrix, a receiving beamforming vector and a spatial-domain reception filter.

In one embodiment, the meaning of two reference signals being QCL includes: antenna ports of the two reference signals are QCL.

In one embodiment, the meaning of two reference signals being QCL includes: a same QCL parameter is used to receive the two reference signals.

In one embodiment, the meaning of two reference signals being QCL includes: a same QCL parameter is used to transmit the two reference signals.

In one embodiment, the meaning of two reference signals being QCL includes: a same QCL parameter is used to transmit one of the two reference signals and receive the other of the two reference signals.

In one embodiment, the first node detects the response to the target signal in the reference radio resource group, and the first node assumes that a beam failure recovery on the target cell succeeds.

In one embodiment, the first node detects the response to the target signal in the reference radio resource group, and the first node assumes that a link failure recovery on the target cell succeeds.

In one embodiment, the first node does not detect the response to the target signal in the reference radio resource group, and the first node assumes that a beam failure recovery on the target cell fails.

In one embodiment, the first node does not detect the response to the target signal in the reference radio resource group, and the first node assumes that a link failure recovery on the target cell fails.

In one embodiment, the phrase of monitoring a response to the target signal includes: the monitoring refers to blind decoding, that is, a signal is received and decoding operation is performed; if the decoding is determined to be correct according to a CRC bit, it is judged that the response to the target signal is detected; otherwise, it is judged that the response to the target signal is not detected.

In one embodiment, the phrase of monitoring a response to the target signal includes: the monitoring refers to a coherent detection, that is, a coherent reception is performed and energy of a signal acquired after the coherent reception is measured; if the energy of the signal acquired after the coherent reception is greater than a first given threshold, it is judged that the response to the target signal is detected; otherwise, it is judged that the response to the target signal is not detected.

In one embodiment, the phrase of monitoring a response to the target signal includes: the monitoring refers to an energy detection, that is, energy of a radio signal is sensed and is averaged to acquire receive energy; if the receive energy is greater than a second given threshold, it is judged that the response to the target signal is detected; otherwise, it is judged that the response to the target signal is not detected.

In one embodiment, the phrase of monitoring a response to the target signal includes determining whether the response to the target signal is transmitted according to a CRC.

In one embodiment, the phrase of monitoring a response to the target signal includes not determining whether the response to the target signal is transmitted before judging whether decoding is correct according to CRC.

In one embodiment, the phrase of monitoring a response to the target signal includes: determining whether the response to the target signal is transmitted according to a coherent detection.

In one embodiment, the phrase of monitoring a response to the target signal includes: not determining whether the response to the target signal is transmitted before a coherent detection.

In one embodiment, the phrase of monitoring a response to the target signal includes: determining whether the response to the target signal is transmitted according to an energy detection.

In one embodiment, the phrase of monitoring a response to the target signal includes: not determining whether the response to the target signal is transmitted before an energy detection.

In one embodiment, the meaning of the phrase of monitoring a target signal includes: the monitoring refers to blind decoding, that is, a signal is received and decoding operation is performed; if decoding is determined to be correct according to a CRC bit, it is judged that the target signal is detected; otherwise, it is judged that the target signal is not detected.

In one embodiment, the meaning of the phrase of monitoring a target signal includes: the monitoring refers to a coherent detection, that is, a coherent reception is performed and energy of a signal acquired after the coherent reception is measured; if the energy of the signal acquired after the coherent reception is greater than a first given threshold, it is judged that the target signal is detected; otherwise, it is judged that the target signal is not detected.

In one embodiment, the meaning of the phrase of monitoring a target signal includes: the monitoring refers to an energy detection, that is, energy of a radio signal is sensed and is averaged to acquire receive energy; if the receive energy is greater than a second given threshold, it is judged that the target signal is detected; otherwise, it is judged that the target signal is not detected.

In one embodiment, the meaning of the phrase of monitoring a target signal includes determining whether the target signal is transmitted according to CRC.

In one embodiment, the meaning of the phrase of monitoring a target signal includes: not determining whether the target signal is transmitted before judging whether decoding is correct according to CRC.

In one embodiment, the meaning of the phrase of monitoring a target signal includes: determining whether the target signal is transmitted according to a coherent detection.

In one embodiment, the meaning of the phrase of monitoring a target signal includes: not determining whether the target signal is transmitted before a coherent detection.

In one embodiment, the meaning of the phrase of monitoring a target signal includes: determining whether the target signal is transmitted according to an energy detection.

In one embodiment, the meaning of the phrase of monitoring a target signal includes: not determining whether the target signal is transmitted before an energy detection.

In one embodiment, the first time window comprises consecutive time-domain resources.

In one embodiment, a duration of the first time window is configured by a higher-layer signaling.

In one embodiment, a duration of the first time window is configured by a BeamFailureRecoveryConfig IE.

In one embodiment, a duration of the first time window is configured by a beamFailureRecoveryTimer.

In one embodiment, a duration of the first time window is configured by an m-ContentionResolutionTimer.

In one embodiment, time-domain resources occupied by the target radio resource group are used to determine the first time window.

In one embodiment, partial time-domain resources occupied by the target radio resource group are used to determine the first time window.

In one embodiment, time-domain resources occupied by the target radio resource group are used to determine a start time of the first time window.

In one embodiment, a start time of the first time window is not earlier than a start time of a slot to which the target radio resource group belongs in time domain.

In one embodiment, a start time of the first time window is not earlier than an end time of a slot to which the target radio resource group belongs in time domain.

In one embodiment, a start time of the first time window is not earlier than an end time of the target radio resource group.

In one embodiment, a start time of the first time window is later than an end time of the target radio resource group.

In one embodiment, a start time of the first time window is not earlier than a start time of the target radio resource group.

In one embodiment, a start time of the first time window is later than a start time of the target radio resource group.

In one embodiment, the target radio resource group is used to determine a first slot, and the first slot is used to determine the first time window.

In one embodiment, the first slot is a slot comprising the target radio resource group.

In one embodiment, the first slot is a slot comprising the first radio resource block.

In one embodiment, the first slot is a slot comprising the second radio resource block.

In one embodiment, the first slot is slot n1, the first time window starts from slot n1+X1, X1 being a positive integer.

In one subembodiment of the above embodiment, X1 is equal to 4.

In one subembodiment of the above embodiment, X1 is not equal to 4.

In one subembodiment of the above embodiment, X1 is configured by a higher-layer signaling.

In one subembodiment of the above embodiment, X1 is pre-defined.

In one embodiment, the target radio resource group comprises a radio resource group in a group of periodically occurring radio resource groups, a fourth radio resource group is a radio resource group later than the target radio resource group in time domain in the group of periodically occurring radio resource groups, and an end time of the first time window is not later than the fourth radio resource group.

In one embodiment, the target radio resource group comprises a radio resource group in a group of periodically occurring radio resource groups, a fourth radio resource group is an adjacent radio resource group later than the target radio resource group in time domain in the group of periodically occurring radio resource groups, and an end time of the first time window is not later than the fourth radio resource group.

In one embodiment, the target radio resource group comprises a radio resource group in a group of periodically occurring radio resource groups, and the first time window comprises at least one period of the group of periodically occurring radio resource groups.

In one embodiment, the target radio resource group comprises a radio resource group in a group of periodically occurring radio resource groups, and the first time window comprises one period in the group of periodically occurring radio resource groups.

In one embodiment, a group of periodically occurring radio resource groups is a group of periodical PUCCH resources.

In one embodiment, a group of periodically occurring radio resource groups is a group of periodical PRACH resources.

In one embodiment, when the target cell is the first serving cell, whether the link failure occurs on the second serving cell is used to determine a duration of the first time window.

In one embodiment, the target cell is the first serving cell; when the link failure does not occur in the second serving cell, the duration of the first time window is equal to a first value; when the link failure occurs on the second serving cell, the duration of the first time window is equal to a second value; and the first value and the second value are both positive real numbers.

In one embodiment, when the target cell is the first serving cell, a duration of the first time window is a first value or a second value, the first reference signal subgroup corresponds to the first value, and the second reference signal subgroup corresponds to the second value; whether a link failure is corresponding to the first reference signal subgroup or the second reference signal subgroup is used to determine whether the duration of the first time window is the first value or the second value; the first value and the second value are positive real numbers.

In one embodiment, the target cell is the first serving cell; when a failure occurs on a link corresponding to the first reference signal subgroup and a failure does not occur in a link corresponding to the second reference signal subgroup, the duration of the first time window is the first value; when a failure occurs on a link corresponding to the second reference signal subgroup, the duration of the first time window is the second value.

In one embodiment, the first value is different from the second value.

In one embodiment, the first value is not greater than the second value.

In one embodiment, the first value and the second value are configured by a higher-layer parameter.

In one embodiment, the first reference signal subgroup comprises at least one reference signal, and the second reference signal subgroup comprises at least one reference signal.

In one embodiment, the target signal is used to indicate a first reference signal.

In one embodiment, the target signal comprises a random access preamble, and the random access preamble comprised in the target signal is used to indicate a first reference signal.

In one embodiment, the target radio resource group is used to indicate a first reference signal.

In one embodiment, M1 reference signals respectively correspond to M1 random access preambles, the random access preamble comprised in the target signal is one of the M1 random access preambles, and the first reference signal is a reference signal corresponding to the random access preamble comprised in the target signal in the M1 reference signals.

In one embodiment, M1 reference signals respectively correspond to M1 radio resource groups, the target radio resource group is one of the M1 radio resource groups, and the first reference signal is one of the M1 reference signals corresponding to the target radio resource group.

In one embodiment, the first subsignal is used to indicate a first reference signal.

In one embodiment, the first subsignal comprises a random access preamble, and the random access preamble comprised in the first subsignal is used to indicate the first reference signal.

In one embodiment, M1 reference signals respectively correspond to M1 random access preambles, the random access preamble comprised in the first subsignal is one of the M1 random access preambles, and the first reference signal is one of the M1 reference signals corresponding to the random access preamble comprised in the first subsignal.

In one embodiment, the M1 reference signals respectively correspond to M1 radio resource blocks, the first radio resource block is one of the M1 radio resource blocks, and the first reference signal is one of the M1 reference signals corresponding to the first radio resource block.

In one embodiment, the target signal carries a first message, and the first message is used to indicate the first reference signal.

In one embodiment, the target signal carries a first message, and the first message is used to indicate an index of the first reference signal.

In one embodiment, the second subsignal is used to indicate a first reference signal.

In one embodiment, the second subsignal carries a first message, and the first message is used to indicate the first reference signal.

In one embodiment, the second subsignal carries a first message, and the first message indicates an index of the first reference signal.

In one embodiment, the first node receives the first reference signal with a same spatial filter and monitors the response to the target signal in the reference radio resource group.

In one subembodiment of the above embodiment, the target cell is the first serving cell.

In one subembodiment of the above embodiment, the target cell is the first serving cell, and the link failure occurs on the second serving cell.

In one embodiment, the first node assumes that a same antenna port QCL parameter is used to receive the first reference signal and monitors the response to the target signal in the reference radio resource group.

In one subembodiment of the above embodiment, the target cell is the first serving cell.

In one subembodiment of the above embodiment, the target cell is the first serving cell, and the link failure occurs on the second serving cell.

In one embodiment, the first node assumes that a DMRS port for a response to the target signal transmitted in the reference radio resource group is QCL with the first reference signal.

In one subembodiment of the above embodiment, the target cell is the first serving cell.

In one subembodiment of the above embodiment, the target cell is the first serving cell, and the link failure occurs on the second serving cell.

In one embodiment, a method in the first node comprises:

receiving a first reference signal set;

herein, the first reference signal set comprises the first reference signal.

In one embodiment, the first receiver receives a first reference signal set; herein, the first reference signal set comprises the first reference signal.

In one embodiment, a method in the second node comprises:

transmitting a first reference signal set;

herein, the first reference signal set comprises the first reference signal.

In one embodiment, the second transmitter transmits a first reference signal set; herein, the first reference signal set comprises the first reference signal.

Embodiment 6

Figure 6:
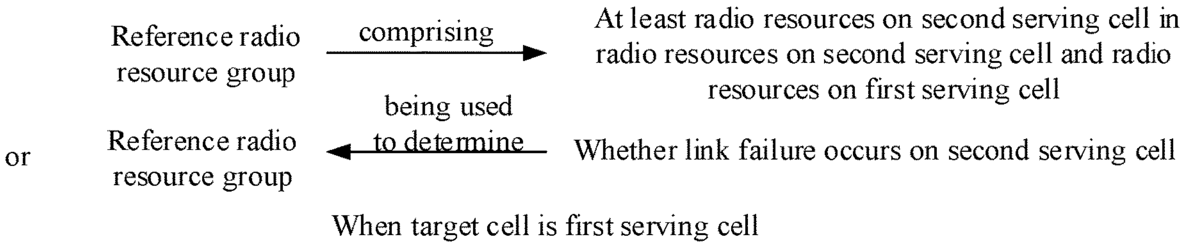
FIG. 6 illustrates a schematic diagram of a reference radio resource group according to one embodiment of the present disclosure.

Embodiment 6 illustrates a schematic diagram of a reference radio resource group according to one embodiment of the present disclosure, as shown in FIG. 6.

In embodiment 6, when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

In one embodiment, when the target cell is the first serving cell, the reference radio resource group comprises at least the radio resources on second serving cell in radio resources on the second serving cell and radio resources on the first serving cell.

In one embodiment, when the target cell is the first serving cell, the reference radio resource group only comprises radio resources on the second serving cell.

In one embodiment, when the target cell is the first serving cell, the reference radio resource group comprises radio resources on the second serving cell and radio resources on the first serving cell.

In one embodiment, when the target cell is the first serving cell, whether the link failure occurs on the second serving cell is used to determine the reference radio resource group.

In one embodiment, when the target cell is the first serving cell, whether the link failure occurs on the second serving cell is used to determine whether the reference radio resource group comprises radio resources on the second serving cell.

In one embodiment, radio resources on the given cell are configured for radio resources of the given cell.

In one embodiment, radio resources on the given cell are configured for a signaling of the given cell.

In one embodiment, radio resources on the given cell are configured for a higher-layer signaling of the given cell.

In one embodiment, radio resources on the given cell are configured for a higher-layer parameter of the given cell.

Embodiment 7

Figure 7:
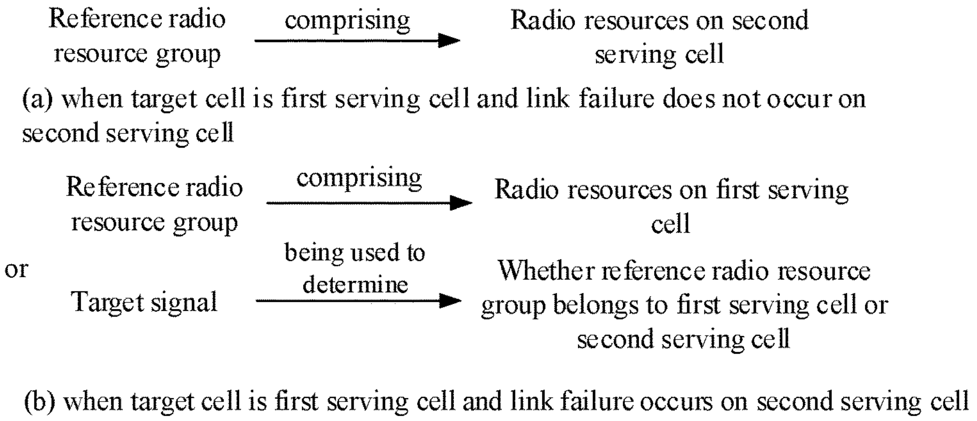
FIG. 7 illustrates a schematic diagram of a reference radio resource group according to another embodiment of the present disclosure.

Embodiment 7 illustrates a schematic diagram of a reference radio resource group according to another embodiment of the present disclosure, as shown in FIG. 7.

In embodiment 7, when the target cell is the first serving cell and the link failure does not occur in the second serving cell, the reference radio resource group comprises radio resources on the second serving cell; when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

In one embodiment, when the target cell is the first serving cell and the link failure does not occur in the second serving cell, the reference radio resource group only comprises radio resources on the second serving cell.

In one embodiment, when the target cell is the first serving cell and the link failure does not occur in the second serving cell, the reference radio resource group comprises radio resources on the first serving cell and radio resources on the second serving cell.

In one embodiment, when the target cell is the first serving cell and the link failure occurs on the second serving cell, the reference radio resource group only comprises radio resources on the first serving cell.

In one embodiment, when the target cell is the first serving cell and the link failure occurs on the second serving cell, the reference radio resource group comprises radio resources on the first serving cell and radio resources on the second serving cell.

In one embodiment, when the target cell is the first serving cell and the link failure occurs on the second serving cell, the target signal is used to determine whether the reference radio resource group belongs to the first serving cell or the second serving cell.

In one embodiment, the target signal is used to indicate a first reference signal, and the reference radio resource group comprises radio resources of a serving cell where the first reference signal is located.

In one embodiment, the target signal is used to indicate a first reference signal, and the reference radio resource group belongs to a serving cell where the first reference signal is located.

In one embodiment, the target signal is used to indicate a first reference signal, when the first reference signal is a reference signal on the first serving cell, the reference radio resource group belongs to the first serving cell; and when the first reference signal is a reference signal on the second serving cell, the reference signal resource group belongs to the second serving cell.

In one embodiment, the target signal is used to indicate a first reference signal, and a TCI state of the first reference signal is used to determine whether the reference radio resource group belongs to the first serving cell or the second serving cell.

In one embodiment, the target signal is used to indicate a first reference signal, a first given reference signal is a reference signal indicated by a TCI state of the first reference signal, and the reference radio resource group comprises radio resources of a serving cell where the first reference signal is located.

In one embodiment, the target signal is used to indicate a first reference signal, a first given reference signal is a reference signal indicated by a TCI state of the first reference signal; when the first given reference signal is a reference signal on the first serving cell, the reference radio resource group comprises radio resources of the first serving cell; when the first given reference signal is a reference signal on the second serving cell, the reference radio resource group comprises radio resources of the second serving cell.

In one embodiment, a serving cell to which a radio resource group belongs is configured with a serving cell of the radio resource.

In one embodiment, a serving cell where a reference signal is located is configured with a serving cell of the reference signal.

In one embodiment, a reference signal on the given cell is a reference signal configured for the given cell.

In one embodiment, a reference signal on the given cell is configured for a signaling of the given cell.

In one embodiment, a reference signal on the given cell is configured for a higher-layer signaling of the given cell.

In one embodiment, a reference signal on the given cell is configured for a higher-layer parameter of the given cell.

Embodiment 8

Figure 8:
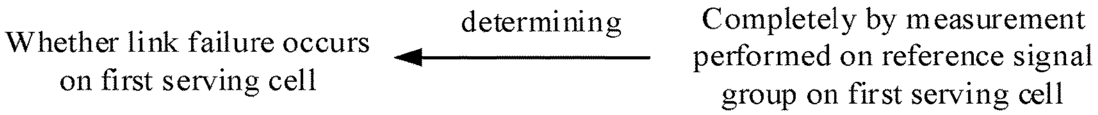
FIG. 8 illustrates a schematic diagram of determining whether a link failure occurs on a first serving cell according to one embodiment of the present disclosure.

Embodiment 8 illustrates a schematic diagram of determining whether a link failure occurs on a first serving cell according to one embodiment of the present disclosure, as shown in FIG. 8.

In embodiment 8, whether a link failure occurs on the first serving cell is completely determined by a measurement performed on the reference signal group on the first serving cell.

In one embodiment, whether a link failure occurs one the given cell is completely determined by a measurement performed on the reference signal group on the given cell.

In one embodiment, whether a link failure occurs on the given cell is unrelated to a measurement performed on the reference signal group on a serving cell other than the given cell.

Embodiment 9

Figure 9:
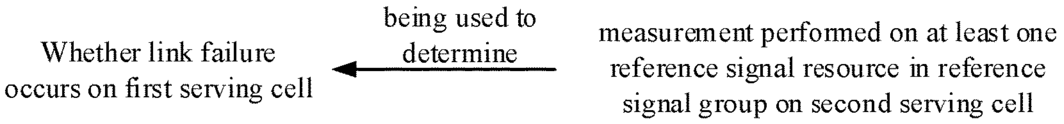
FIG. 9 illustrates a schematic diagram of determining whether a link failure occurs on a first serving cell according to another embodiment of the present disclosure.

Embodiment 9 illustrates a schematic diagram of determining whether a link failure occurs on a first serving cell according to another embodiment of the present disclosure, as shown in FIG. 9.

In embodiment 9, a measurement performed on at least one reference signal resource in the reference signal group on the second serving cell is used to determine whether a link failure occurs on the first serving cell.

In one embodiment, when the target cell is the first serving cell, the reference radio resource group comprises radio resources on the second serving cell and radio resources on the first serving cell.

In one embodiment, when the target cell is the first serving cell, the reference radio resource group comprises radio resources on the first serving cell.

In one embodiment, for any serving cell other than the first serving cell in the first cell group, whether a link failure occurs on the any serving cell is completely determined by a measurement performed on the reference signal group on the any serving cell.

In one embodiment, for any serving cell other than the first serving cell in the first cell group, whether a link failure occurs on the any serving cell is unrelated to a measurement performed on the reference signal group on a serving cell other than the any serving cell.

In one embodiment, a measurement performed on the reference signal group on the second serving cell and a measurement performed on the reference signal group on the first serving cell are used together to determine whether a link failure occurs on the first serving cell.

In one embodiment, a third reference signal subgroup belongs to the reference signal group on the second serving cell, and a measurement performed on the third reference signal subgroup is used to determine whether a link failure occurs on the first serving cell.

In one embodiment, a measurement performed on at least one reference signal resource in the reference signal group on the second serving cell and a measurement performed on the reference signal group on the first serving cell are used together to determine whether a link failure occurs on the first serving cell.

Embodiment 10

Figure 10:
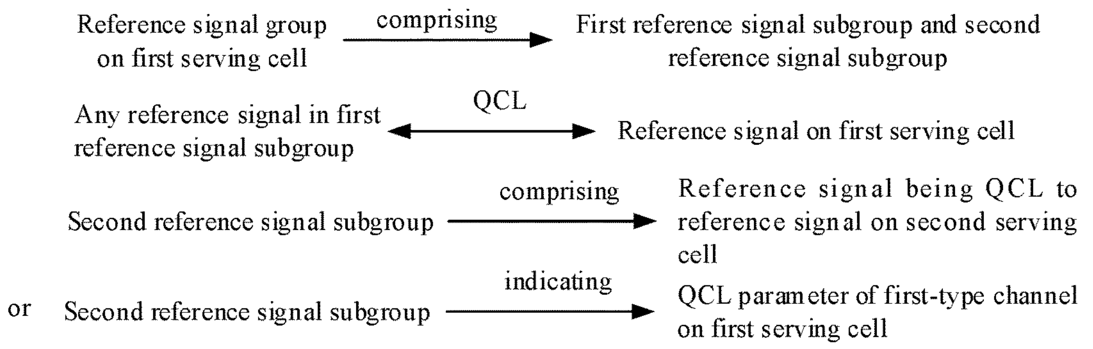
FIG. 10 illustrates a schematic diagram of a first reference signal subgroup and a second reference signal subgroup according to one embodiment of the present disclosure.

Embodiment 10 illustrates a schematic diagram of a first reference signal subgroup and a second reference signal subgroup according to one embodiment of the present disclosure, as shown in FIG. 10.

In embodiment 10, the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell.

In one embodiment, there exists a reference signal in the reference signal group on the first serving cell being QCL with a reference signal on the second serving cell.

In one embodiment, the reference signal on the second serving cell belongs to the reference signal group on the second serving cell.

In one embodiment, the reference signal on the second serving cell does not belong to the reference signal group on the second serving cell.

In one embodiment, the second reference signal subgroup comprises a reference signal that is QCL with a reference signal on the second serving cell In one embodiment, there exists a reference signal in the second reference signal subgroup being QCL with a reference signal on the second serving cell.

In one embodiment, the second reference signal subgroup is used to indicate a QCL parameter of a first-type channel on the first serving cell.

In one embodiment, the second reference signal subgroup also comprises at least one reference signal in the first reference signal subgroup.

In one embodiment, there exists one reference signal in the second reference signal subgroup being QCL with a reference signal in the first reference signal subgroup.

In one embodiment, the first-type channel comprises a PDSCH.

In one embodiment, the first-type channel comprises a PDCCH.

In one embodiment, the first-type channel comprises a PUSCH.

In one embodiment, an antenna port of the second reference signal subgroup is QCL with a DMRS antenna port of the first-type channel on the first serving cell.

In one embodiment, a QCL parameter of any first-type channel on the first serving cell is the same as a QCL parameter of at least one reference signal in the second reference signal subgroup.

In one embodiment, a QCL parameter of a first-type channel on the first serving cell is the same as a QCL parameter of the second reference signal subgroup.

In one embodiment, the first node assumes that a same antenna port QCL parameter is used to receive a first-type channel on the first serving cell and at least one reference signal in the second reference signal subgroup.

Embodiment 11

Figure 11:
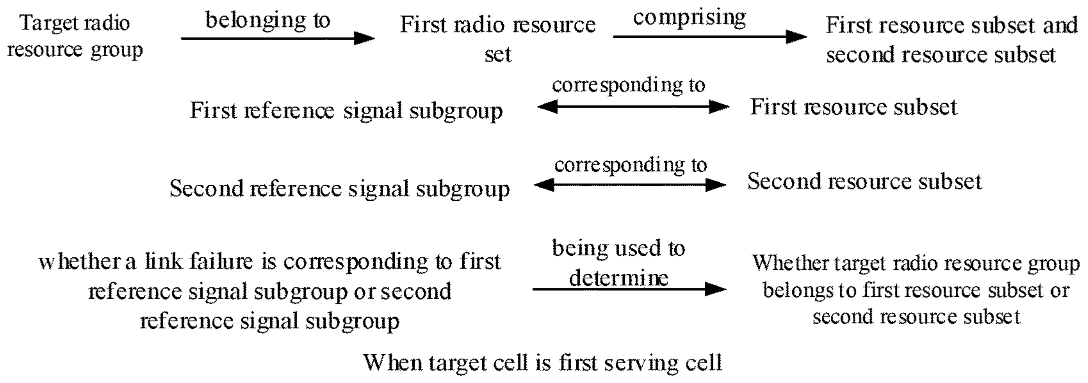
FIG. 11 illustrates a schematic diagram of relations among a target radio resource group and a first resource subset and a second resource subset according to one embodiment of the present disclosure.

Embodiment 11 illustrates a schematic diagram of relations among a target radio resource group and a first resource subset and a second resource subset according to one embodiment of the present disclosure, as shown in FIG. 11.

In embodiment 11, when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

In one embodiment, when a failure occurs on a link corresponding to the first reference signal subgroup and a failure does not occur in a link corresponding to the second reference signal subgroup, the target radio resource group belongs to the first resource subset.

In one embodiment, when a failure occurs on a link corresponding to the second reference signal subgroup, the target radio resource group belongs to the second resource subset.

In one subembodiment of the above embodiment, a failure does not occur in a link corresponding to the first reference signal subgroup.

In one subembodiment of the above embodiment, a failure occurs on a link corresponding to the first reference signal subgroup.

In one embodiment, when a failure occurs on a link corresponding to the first reference signal subgroup and a failure occurs on a link corresponding to the second reference signal subgroup, the target radio resource group belongs to the first resource subset.

In one embodiment, when the target cell is the first serving cell, the target radio resource group belongs to a first radio resource set; there exists one reference signal in the reference signal group on the first serving cell corresponding to two radio resources in the first radio resource set.

In one embodiment, the first resource subset comprises at least one radio resource, and the second resource subset comprises at least one radio resource.

In one embodiment, the first resource subset is orthogonal to the second resource subset.

In one embodiment, any radio resource in the first resource subset does not belong to the second resource subset.

In one embodiment, the second resource subset comprises the first resource subset.

In one embodiment, the first reference signal subgroup and the second reference signal subgroup comprise a same reference signal, and the same reference corresponds to two radio resources respectively belonging to the first resource subset and the second resource subset.

In one embodiment, when a failure occurs on any link in a link corresponding to the first reference signal subgroup and a link corresponding to the first reference signal subgroup, the link failure occurs on the first serving cell.

In one embodiment, when a failure occurs on both a link corresponding to the first reference signal subgroup and a link corresponding to the first reference signal subgroup, the link failure occurs on the first serving cell.

In one embodiment, a measurement performed on a given reference signal group is used to judged that whether a value a first counter is not less than a first threshold; whether the first counter is not less than the first threshold is used to determine whether a failure occurs on a link corresponding to the given reference signal group; when the first counter is not less than the first threshold, a failure occurs on a link corresponding to the given reference signal group; and when the first counter is less than the first threshold, a failure does not occur in a link corresponding to the given reference signal group;

In one subembodiment of the above embodiment, the given reference signal group is the first reference signal subgroup or the second reference signal subgroup.

In one embodiment, a radio link quality determined by a measurement performed on a given reference signal group being worse than a target threshold is used to trigger reporting a first-type indication from a physical layer to a higher layer; the first-type indication received by the higher layer is used to determine whether a failure occurs on a link corresponding to the given reference signal group; when the first counter is not less than the first threshold, a failure occurs on a link corresponding to the given reference signal group; and when the first counter is less than the first threshold, a failure does not occur in a link corresponding to the given reference signal group;

In one subembodiment of the above embodiment, the given reference signal group is the first reference signal subgroup or the second reference signal subgroup.

In one embodiment, a radio link quality determined by a measurement performed on a given reference signal group being worse than a target threshold is used to trigger reporting a first-type indication from a physical layer to a higher layer; the higher layer adds 1 to a value of a first counter each time it receives the first-type indication, and whether the first counter is not less than a first threshold is used to determine whether a failure occurs on a link corresponding to the given reference signal group; when the first counter is not less than the first threshold, a failure occurs on a link corresponding to the given reference signal group; and when the first counter is less than the first threshold, a failure does not occur in a link corresponding to the given reference signal group;

In one subembodiment of the above embodiment, the given reference signal group is the first reference signal subgroup or the second reference signal subgroup.

Embodiment 12

Figure 12:
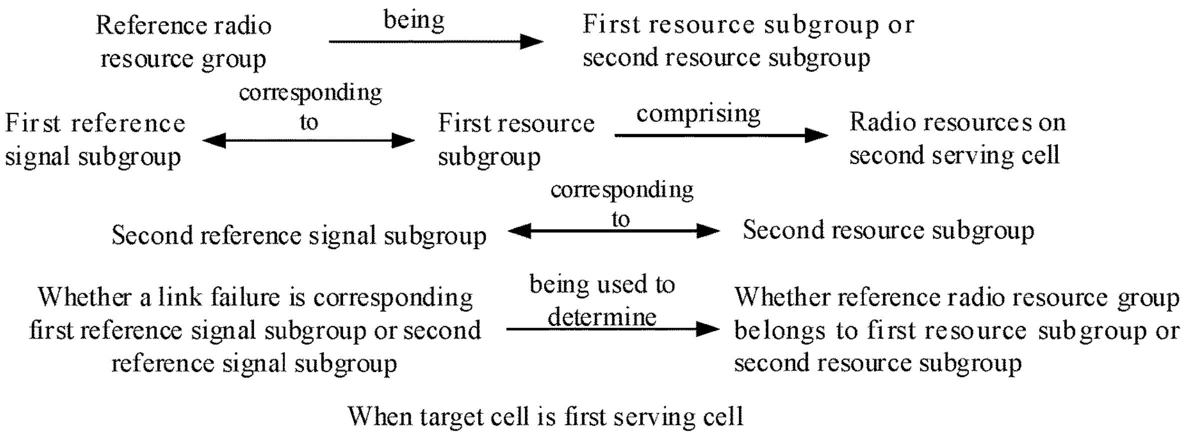
FIG. 12 is a schematic diagram of relations among a reference radio resource group and a first resource subgroup and a second resource subgroup according to one embodiment of the present disclosure.

Embodiment 12 is a schematic diagram of relations among a reference radio resource group and a first resource subgroup and a second resource subgroup according to one embodiment of the present disclosure, as shown in FIG. 12.

In embodiment 12, when the target cell is the first serving cell, the reference radio resource group is a first resource subgroup or a second resource subgroup, the first reference signal subgroup corresponds to the first resource subgroup, and the second reference signal subgroup corresponds to the second resource subgroup; whether a link failure is corresponding to the first reference signal subgroup or the second reference signal subgroup is used to determine whether the reference radio resource group is the first resource subgroup or the second resource subgroup; the first resource subgroup comprises radio resources on the second serving cell.

In one embodiment, the first resource subgroup only comprises radio resources on the second serving cell.

In one embodiment, the first resource subgroup also comprises radio resources on the first serving cell.

In one embodiment, the second resource subgroup comprises radio resources on the first serving cell.

In one embodiment, the second resource subgroup only comprises radio resources on the first serving cell.

In one embodiment, the second resource subgroup comprises radio resources on the first serving cell and radio resources on the second serving cell.

In one embodiment, the first resource subgroup comprises at least one radio resource, and the second resource subgroup comprises at least one radio resource.

In one embodiment, when a failure occurs on a link corresponding to the first reference signal subgroup and a failure does not occur in a link corresponding to the second reference signal subgroup, the reference radio resource group is the first resource subgroup.

In one embodiment, when a failure occurs on a link corresponding to the second reference signal subgroup, the reference radio resource group is the second resource subgroup.

In one subembodiment of the above embodiment, a failure does not occur in a link corresponding to the first reference signal subgroup.

In one subembodiment of the above embodiment, a failure occurs on a link corresponding to the first reference signal subgroup.

In one embodiment, when a failure occurs on a link corresponding to the first reference signal subgroup and a failure occurs on a link corresponding to the second reference signal subgroup, the reference radio resource group is the first resource subgroup.

In one embodiment, when a failure occurs on a link corresponding to the second reference signal subgroup, the target signal is used to determine whether the reference radio resource group is the first resource subgroup or the second resource subgroup.

In one embodiment, the target signal is used to indicate a first reference signal, and the reference radio resource group is a resource subgroup comprising radio resources of a serving cell where the first reference signal is located in the first resource subgroup and the second resource subgroup.

In one embodiment, the target signal is used to indicate a first reference signal, and the reference radio resource group is a resource subgroup belonging to a serving cell where the first reference signal is located in the first resource subgroup and the second resource subgroup.

In one embodiment, the target signal is used to indicate a first reference signal, when the first reference signal is a reference signal on the first serving cell, the reference radio resource group is the second resource subgroup; and when the first reference signal is a reference signal on the second serving cell, the reference signal resource group is the first resource subgroup.

In one embodiment, the target signal is used to indicate a first reference signal, and a TCI state of the first reference signal is used to determine whether the reference radio resource group belongs to the first serving cell or the second serving cell.

In one embodiment, the target signal is used to indicate a first reference signal, a given reference signal is a reference signal indicated by a TCI state of the first reference signal, and the reference radio resource group is a resource subgroup comprising radio resources of a serving cell where the first given reference signal is located in the first resource subgroup and the second resource subgroup.

In one embodiment, the target signal is used to indicate a first reference signal, a first given reference signal is a reference signal indicated by a TCI state of the first reference signal; when the first given reference signal is a reference signal on the first serving cell, the reference radio resource group is the second resource subgroup; and when the first given reference signal is a reference signal on the second serving cell, the reference signal resource group is the first resource subgroup.

Embodiment 13

Figure 13:
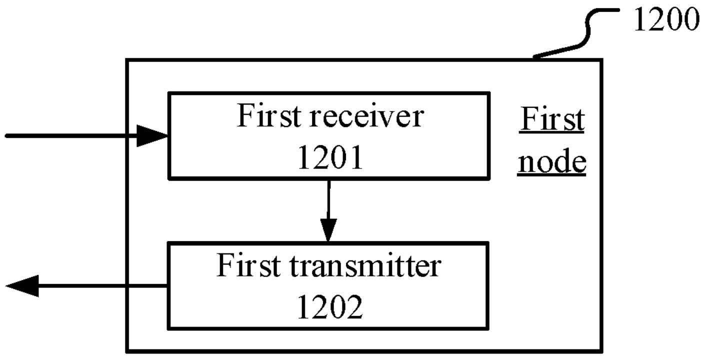
FIG. 13 illustrates a structure block diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, a processing device 1200 in a first node comprises a first receiver 1201 and a first transmitter 1202.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460, or the data source 467 in Embodiment 4.

The first receiver 1201 receives a reference signal group on each serving cell respectively in a first cell group; and the first transmitter 1202 transmits a target signal in a target radio resource group;

in embodiment 13, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the first receiver 1201 monitors a response for the target signal in a reference radio resource group; herein, the reference radio resource group belongs to a first time window in time domain, and the target radio resource group is used to determine the first time window.

In one embodiment, when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

In one embodiment, when the target cell is the first serving cell and the link failure does not occur in the second serving cell, the reference radio resource group comprises radio resources on the second serving cell; when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

In one embodiment, a measurement performed on at least one reference signal resource in the reference signal group on the second serving cell is used to determine whether a link failure occurs on the first serving cell.

In one embodiment, the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell.

In one embodiment, when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

In one embodiment, when the target cell is the first serving cell, the reference radio resource group is a first resource subgroup or a second resource subgroup, the first reference signal subgroup corresponds to the first resource subgroup, and the second reference signal subgroup corresponds to the second resource subgroup; whether a link failure is corresponding to the first reference signal subgroup or the second reference signal subgroup is used to determine whether the reference radio resource group is the first resource subgroup or the second resource subgroup; the first resource subgroup comprises radio resources on the second serving cell.

Embodiment 14

Figure 14:
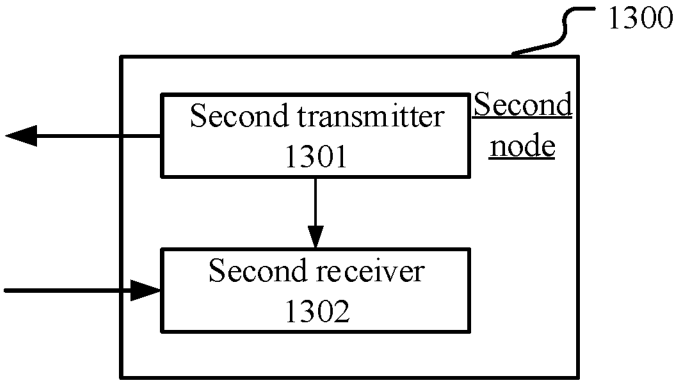
FIG. 14 illustrates a structure block diagram of a processing device in a second node according to one embodiment of the present disclosure.

Embodiment 14 illustrates a structure block diagram of a processing device in a second node according to one embodiment of the present disclosure, as shown in FIG. 14. In FIG. 14, a second node processing device 1300 comprises a second transmitter 1301 and a second receiver 1302.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475, or the memory 476 in Embodiment 4.

In one embodiment, the second receiver 1302 comprises at least one of the antenna 420, the receiver 418, the receiving processor 470, the multi-antenna receiving processor 472, the controller/processor 475, or the memory 476 in Embodiment 4.

The second transmitter 1301 transmits a reference signal group on each serving cell respectively in a first cell group; and the second receiver 1302 receives a target signal in a target radio resource group;

in embodiment 14, the first cell group comprises a first serving cell, a second serving cell and at least one other serving cell; a given cell is any serving cell in the first cell group, a measurement performed on the reference signal group on the given cell is used to determine whether a link failure occurs on the given cell; the link failure on a target cell is used to trigger the target signal, and at least the target radio resource group in the target radio resource group and the target signal is used to indicate that the target cell is one of three possibilities of the first serving cell, the second serving cell and the other serving cell.

In one embodiment, the second transmitter 1301 transmits a response to the target signal in a reference radio resource group; herein, the reference radio resource group belongs to a first time window in time domain, and the target radio resource group is used to determine the first time window.

In one embodiment, when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

In one embodiment, when the target cell is the first serving cell and the link failure does not occur in the second serving cell, the reference radio resource group comprises radio resources on the second serving cell; when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

In one embodiment, a measurement performed on at least one reference signal resource in the reference signal group on the second serving cell is used to determine whether a link failure occurs on the first serving cell.

In one embodiment, the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell.

In one embodiment, when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

In one embodiment, when the target cell is the first serving cell, the reference radio resource group is a first resource subgroup or a second resource subgroup, the first reference signal subgroup corresponds to the first resource subgroup, and the second reference signal subgroup corresponds to the second resource subgroup; whether a link failure is corresponding to the first reference signal subgroup or the second reference signal subgroup is used to determine whether the reference radio resource group is the first resource subgroup or the second resource subgroup; the first resource subgroup comprises radio resources on the second serving cell.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) configured for wireless communications, comprising:

a receiver;

a transmitter; and a processor, wherein:

the receiver is configured to receive a reference signal group on each serving cell respectively in a first cell group, wherein the first cell group comprises a first serving cell, a second serving cell, and at least one other serving cell, wherein the reference signal group is used for beam failure detection;

the processor is configured to perform a measurement on a target cell of the first cell group, wherein the target cell is any serving cell in the first cell group;

the processor is further configured to determine, based on the measurement, that a link failure occurs on the target cell; and the transmitter is configured to transmit a target signal in a target radio resource group, wherein the target signal is triggered in response to the link failure on the target cell, wherein at least the target radio resource group and the target signal is used to indicate that the target cell is one of three possibilities of the first serving cell, the second serving cell and the other serving cell, wherein the target radio resource group belongs to a first radio resource set or a second radio resource set, wherein the first serving cell is a primary cell (PCell) or a primary secondary cell group (PSCell), wherein the second serving cell is a secondary cell (SCell) allowed to cross-schedule the PCell or the PSCell, and wherein the at least one other serving cell is an SCell not allowed to cross-schedule the PCell or the PSCell, wherein when the target radio resource group belongs to the first radio resource set, the target cell is the first serving cell, and when the target radio resource group belongs to the second radio resource set, the target signal indicates whether the target cell is the second serving cell or the other serving cell, and wherein the target signal is an indication for a beam failure recovery request.

2. The UE of claim 1, wherein the receiver is further configured to monitor a response to the target signal in a reference radio resource group, wherein the reference radio resource group belongs to a first time window in time domain, and the target radio resource group is used to determine the first time window.

3. The UE of claim 2, wherein when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

4. The UE of claim 1, wherein a measurement performed on at least one reference signal resource in the reference signal group on the second serving cell is used to determine whether a link failure occurs on the first serving cell.

5. The UE of claim 1, wherein the reference signal group on the first serving cell comprises a first reference signal subgroup and a second reference signal subgroup, and any reference signal in the first reference signal subgroup and a reference signal on the first serving cell are quasi-colocated (QCL); the second reference signal subgroup comprises a reference signal that is QCL with a reference signal on the second serving cell, or the second reference signal subgroup is used to indicate a QCL parameter of a first-type channel on the first serving cell; or, the reference signal group on the first serving cell comprises a first reference signal subgroup and a second reference signal subgroup, and wherein any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell; when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

6. The UE of claim 2, wherein when the target cell is the first serving cell and the link failure does not occur on the second serving cell, the reference radio resource group comprises radio resources on the second serving cell.

7. The UE of claim 2, wherein when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

8. The UE of claim 1, wherein the target radio resource group belongs to one of a first radio resource set, a second radio resource set and a third radio resource set; when the target radio resource group belongs to the first radio resource set, the target cell is the first serving cell; when the target radio resource group belongs to the second radio resource set, the target cell is the second serving cell; and when the target radio resource group belongs to the third radio resource set, the target cell is the other serving cell.

9. The UE of claim 1, wherein the target radio resource group belongs to a first radio resource set or a second radio resource set; when the target radio resource group belongs to the first radio resource set, the target cell is the first serving cell; and when the target radio resource group belongs to the second radio resource set, the target signal is used to indicate that the target cell is the second serving cell or the other serving cell.

10. The UE of claim 1, wherein the target radio resource group belongs to one of a first radio resource set and a second radio resource set; when the target radio resource group belongs to the first radio resource set, the target signal is used to indicate that the target cell is the first serving cell or the second serving cell; and when the target radio resource group belongs to the second radio resource set, the target cell is the other serving cell.

11. A method for use by a user equipment (UE) configured for wireless communications, the method comprising:

receiving a reference signal group respectively on each serving cell in a first cell group, wherein the first cell group comprises a first serving cell, a second serving cell, and at least one other serving cell wherein the reference signal group is used for beam failure detection;

performing a measurement on a target cell of the first cell group, wherein the target cell is any serving cell in the first cell group;

determining, based on the measurement, that a link failure occurs on the target cell; and transmitting a target signal in a target radio resource group, wherein the target signal is triggered in response to the link failure on the target cell, wherein at least the target radio resource group and the target signal is used to indicate that the target cell is one of three possibilities of the first serving cell, the second serving cell and the other serving cell, wherein the target radio resource group belongs to a first radio resource set or a second radio resource set, wherein the first serving cell is a primary cell (PCell) or a primary secondary cell group (PSCell), wherein the second serving cell is a secondary cell (SCell) allowed to cross-schedule the PCell or the PSCell, and wherein the at least one other serving cell is an SCell not allowed to cross-schedule the PCell or the PSCell, wherein when the target radio resource group belongs to the first radio resource set, the target cell is the first serving cell, and when the target radio resource group belongs to the second radio resource set, the target signal indicates whether the target cell is the second serving cell or the other serving cell the target signal indicates which of the cells in the first cell group is the target cell, and wherein the target signal is an indication for a beam failure recovery request.

12. The method of claim 11, further comprising:

monitoring a response to the target signal in a reference radio resource group, wherein the reference radio resource group belongs to a first time window in time domain, and the target radio resource group is used to determine the first time window.

13. The method of claim 12, wherein when the target cell is the first serving cell, the reference radio resource group comprises at least the radio resources on the second serving cell in radio resources on the second serving cell and radio resources on the first serving cell, or whether the link failure occurs on the second serving cell is used to determine the reference radio resource group.

14. The method of claim 11, wherein a measurement performed on at least one reference signal resource in the reference signal group on the second serving cell is used to determine whether a link failure occurs on the first serving cell.

15. The method of claim 11, wherein the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell; or, the reference signal group on the first serving cell comprises a first reference signal subgroup and a second reference signal subgroup, and any reference signal in the first reference signal subgroup and a reference signal on the first serving cell are QCL; the second reference signal subgroup comprises a reference signal that is QCL with a reference signal on the second serving cell, or the second reference signal subgroup is used to indicate a QCL parameter of a first-type channel on the first serving cell; when the target cell is the first serving cell, the target radio resource group belongs to a first radio resource set, the first radio resource set comprises a first resource subset and a second resource subset, the first reference signal subgroup corresponds to the first resource subset, and the second reference signal subgroup corresponds to the second resource subset; whether a link failure is corresponding to the first reference signal subgroup or the second reference signal subgroup is used to determine whether the target radio resource group belongs to the first resource subset or the second resource subset.

16. The method of claim 11, wherein when the target cell is the first serving cell and the link failure does not occur on the second serving cell, the reference radio resource group comprises radio resources on the second serving cell.

17. The method of claim 11, wherein when the target cell is the first serving cell and the link failure occurs on the second serving cell, the reference radio resource group comprises radio resources on the first serving cell, or the target signal is used to determine whether the reference radio resource group belongs to the first serving cell or the second serving cell.

18. The method of claim 11, wherein the target radio resource group belongs to one of a first radio resource set, a second radio resource set and a third radio resource set; when the target radio resource group belongs to the first radio resource set, the target cell is the first serving cell; when the target radio resource group belongs to the second radio resource set, the target cell is the second serving cell; and when the target radio resource group belongs to the third radio resource set, the target cell is the other serving cell.

19. The method of claim 11, wherein the target radio resource group belongs to a first radio resource set or a second radio resource set; when the target radio resource group belongs to the first radio resource set, the target cell is the first serving cell; and when the target radio resource group belongs to the second radio resource set, the target signal is used to indicate that the target cell is the second serving cell or the other serving cell.

20. The method of claim 11, wherein the target radio resource group belongs to one of a first radio resource set and a second radio resource set; when the target radio resource group belongs to the first radio resource set, the target signal is used to indicate that the target cell is the first serving cell or the second serving cell; and when the target radio resource group belongs to the second radio resource set, the target cell is the other serving cell.

* * * * *